US005321811A

United States Patent [19]

Kato et al.

[11] Patent Number: 5,321,811

[45] Date of Patent: Jun. 14, 1994

[54] INFORMATION PROCESSING SYSTEM AND APPARATUS

[75] Inventors: Takashi Kato, Asaka; Hiroshi Inoue, Yokohama; Aiko Enomoto, Zama, all of Japan

[73] Assignee: Canon Kabushiki Kaisha, Tokyo, Japan

[21] Appl. No.: 987,242

[22] Filed: Dec. 7, 1992

Related U.S. Application Data

[63] Continuation of Ser. No. 451,523, Dec. 15, 1989, abandoned.

[30] Foreign Application Priority Data

Sep. 8, 1989 [JP] Japan ................................ 1-233771
Sep. 11, 1989 [JP] Japan ................................ 1-236310

[51] Int. Cl.$^5$ ................................ G06F 3/00
[52] U.S. Cl. ................................ 395/166; 395/164
[58] Field of Search ................ 395/164, 166, 162; 340/718, 719, 750; 364/200 MS File, 900 MS File; 345/127, 129, 130, 132

[56] References Cited

U.S. PATENT DOCUMENTS 4,655,561 4/1987 Kanbe et al. .................. 350/350 S
4,691,200 9/1987 Stephany .................. 340/784
4,709,995 12/1987 Kuribayashi et al. .................. 350/350
4,724,433 2/1988 Inoue et al. .................. 350/805
4,776,676 10/1988 Inoue et al. .................. 350/350 S
4,811,240 3/1989 Ballou et al. .................. 364/518
4,816,819 3/1989 Enari et al. .................. 340/811
4,830,467 5/1989 Inoue et al. .................. 350/333
4,922,241 5/1990 Inoue et al. .................. 340/784
4,930,875 6/1990 Inoue et al. .................. 350/333
4,942,514 7/1990 Miyagaki et al. .................. 364/190
4,967,376 10/1990 Katsura .................. 364/521

FOREIGN PATENT DOCUMENTS 0308987 3/1989 European Pat. Off. .
0318050 5/1989 European Pat. Off. .
0361471 4/1990 European Pat. Off. .
2569294 2/1986 France .

OTHER PUBLICATIONS

Journal of Physics E/Scientific Instruments, Experimental Driver And Addressing Techniques For Ferroelectric Liquid Crystal Devices, J. Wahl et al., vol. 21, No. 5, May 1988, Bristol, Great Britain, pp. 460–466.

*Primary Examiner*—Phu K. Nguyen
*Attorney, Agent, or Firm*—Fitzpatrick, Cella, Harper & Scinto

[57] ABSTRACT

In an information processing apparatus, transfer scan line addresses are monitored within a graphic microprocessor partial update routine to continuously transfer image information of addresses of the same scan line when a two-line simultaneous drive waveform is used to increase a frame frequency. The information processing system includes an image information memory for storing received image information a first control for controlling driving of a display memory, and a second control for controlling the image information memory so that storage of the image information in the image information memory and transfer of the image information stored in the memory to a drive control circuit are synchronized with each other.

43 Claims, 25 Drawing Sheets

INFORMATION PROCESSING SYSTEM AND APPARATUS

This application is a continuation of U.S. patent application Ser. No. 07/451,523 filed Dec. 15, 1989, now abandoned.

BACKGROUND OF THE INVENTION

1. Field of the Invention

The present invention relates to an information processing system and apparatus and, more particularly, to an image information processing system and apparatus suitable for a display device using a ferro-electric liquid crystal.

2. Related Background Art

A typical conventional computer terminal display device is a refresh scan type CRT. A vector scan type CRT having a partial memory function is often used for a CAD large, high-precision display. In a vector scan type CRT, once information is displayed on its screen, the screen is not updated until the screen content is erased. Therefore, the vector scan type CRT is not suitable as a real-time man-machine interface display device for performing a cursor shift display, a shift display of an icon such as a mouse as a display of information from a pointing device, an edit display (e.g., insertion, deletion, shift, and copy) of characters and sentences. On the other hand, the refresh scan type CRT requires a refresh cycle of 60 Hz or more as a frame frequency in order to prevent flickering. In order to improve icon readability and a shift display (mouse or cursor) of intrascreen information, a non-interlaced scan scheme is employed((a television receiver has a field frequency of 60 Hz or a frame frequency of 30 Hz in order to achieve a dynamic image display and simplify a drive control system). For this reason, when a display resolution is increased, the display device becomes large in size. In addition, a high power is required, and a drive controller becomes bulky, resulting in high cost.

In recent years, a flat display panel has been introduced to cope with inconvenience of a large, high-power CRT.

Several existing drive schemes are available for the flat display panels. For example, a time-divisional drive system (STN) for a twisted nematic liquid crystal, a monochromatic display system (NTN) as its modification, or a plasma display system employs the same image data transfer scheme as the CRT. In addition, a screen update scheme also employs a non-interlaced scan scheme having a frame frequency of 60 Hz or more. Therefore, the total number of scan lines constituting one frame ranges from 400 to 480, which cannot exceed 1,000 due to the following reason. Since such a display panel does not have a memory function due to the principle of driving, it requires a refresh cycle having a frame frequency of 60 Hz or more to prevent flickering. One horizontal scan interval becomes as short as 10 to 50 μsec or less. As a result, a high contrast level cannot be obtained.

A ferro-electric liquid crystal display device has a larger screen than that of the above display devices and can perform high-precision display. However, in order to cope with the man-machine interface display device at a low frame frequency, a partial update scan scheme (i.e., only scan lines within an update area are scanned) is required. The partial update scan scheme is described in U.S. Pat. No. 4,655,561 to Kanbe et al.

The partial update scan scheme is particularly suitable for the ferro-electric liquid crystal display device to perform a shift display of a mouse or cursor and a scroll display of a multi window. However, partial update scan of different areas cannot be simultaneously performed. When partial update scan is performed by designating a partial update scan start address and its end address, the shift display of a mouse or cursor cannot be performed during scrolling of the multi-window. A window scroll display and a point device display are considered as examples, and their display movements are assumed. Even if the point device is moved after the scroll partial update scan is started on the display panel, update scan of the pointing device cannot be started until the end of scan of the final scan line address of the window. For this reason, the pointing device is discontinuously moved in accordance with the size of the window (i.e., the number of partial update scan lines), resulting in an unnatural shift display.

SUMMARY OF THE INVENTION

It is an object of the present invention to provide an information processing apparatus wherein transfer scan line addresses are monitored within a graphic microprocessor partial update routine to continuously transfer image information of addresses of the same scan line when a two-line simultaneous drive waveform is used to increase a frame frequency.

According to a first characteristic feature of the present invention, there is provided an information processing system comprising:

a. an image information memory for storing received image information;
b. first control means for controlling driving of a display memory; and
c. second control means for controlling the image information memory so that storage of the image information in the image information memory and transfer of the image information stored in the memory to a drive control circuit are synchronized with each other.

According to a second characteristic feature of the present invention, there is provided an information processing system comprising:

a. image information memory for storing received image information and outputting scan line address information for designating a scan line and image information corresponding to the designated scan line;
b. first control means for controlling driving of a display panel; and
c. second control means for controlling output of the scan line address information from the image information memory so as to prevent subsequent scan line scan for a new display from starting from a last scan line of previous scan line scan after the previous scan line scan is interrupted.

DETAILED DESCRIPTION OF THE PREFERRED EMBODIMENTS

Embodiments

Figure 1A:
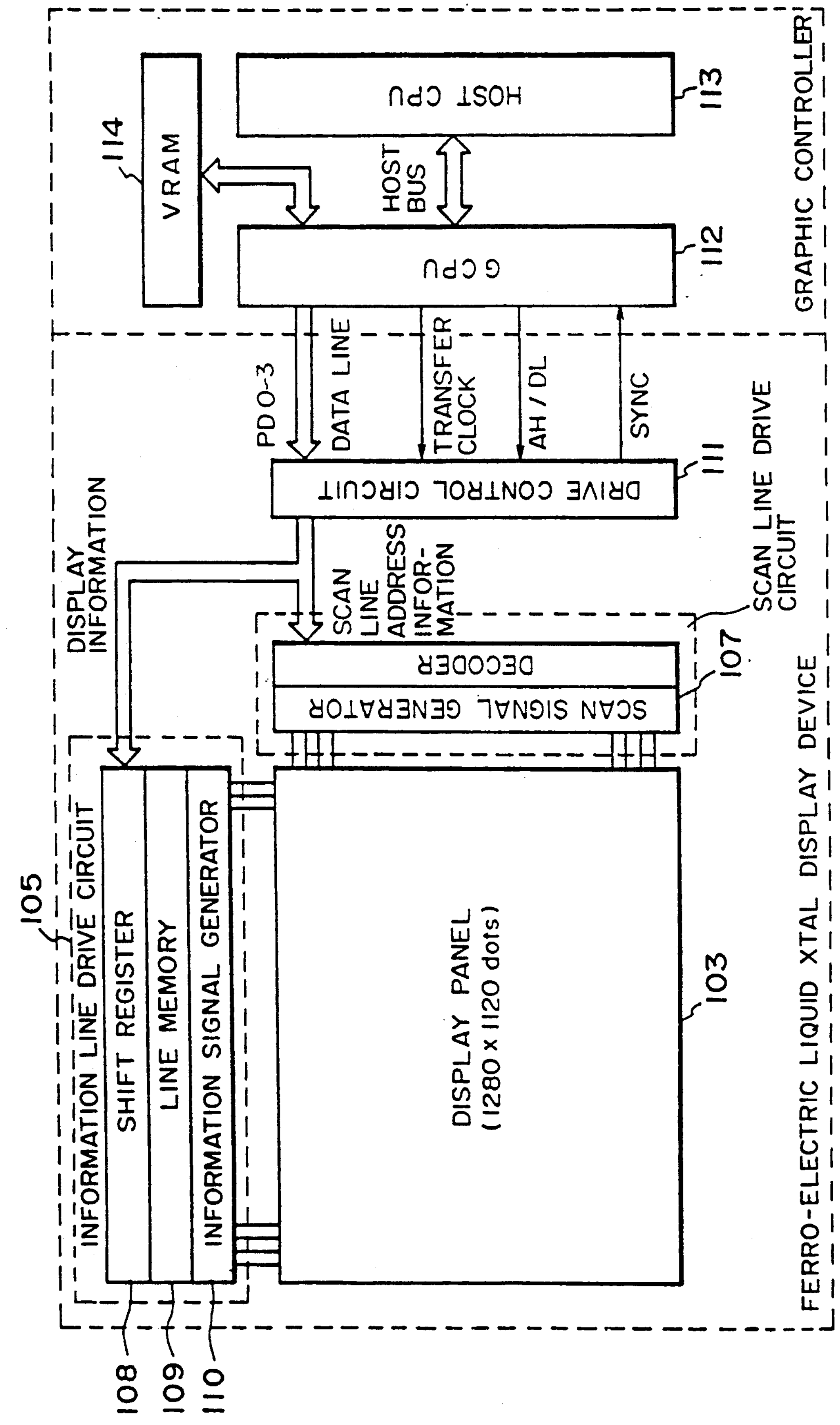
FIGS. 1A and 1B are block diagrams showing a ferro-electric liquid crystal display device and a graphic controller.

FIG. 1A is a block diagram of a ferro-electric liquid crystal display device 101 and a graphic controller 102 arranged in a main unit such as a personal computer serving as a source of display information. FIGS. 2A to 2G are communication timing charts of image information. A display panel 103 is arranged such that 1,120 scan electrodes and 1,280 information electrodes are arranged in a matrix, and a ferro-electric liquid crystal is sealed between two aligned glass plates. The scan lines are connected to a scan line drive circuit 104, and the information lines are connected to an information line drive circuit 105.

An operation of the above apparatus will be described with reference to the accompanying drawings. The graphic controller 102 transfers to a display drive circuit (consisting of the line drive circuits 104 and 105) 104/105 of the liquid crystal display device 101 image information (PD0 to PD3) on the scan line designated by scan line address information for designating the scan electrode and its address information. In this embodiment, in order to transfer image information having the scan line address information and the display information on one transmission line, two types of information must be distinguished from each other. For this purpose, an identification signal AH/DL is used. When the signal AH/DL is set at high level, it represents the scan line address information. However, when the signal AH/DL is set at low level, it represents display information.

The scan line address information is extracted by a drive control circuit 111 in the liquid crystal display device 101 from image information sent as image information PD0 to image information PD3, and the extracted signals are output to the scan line drive circuit 104 at a timing for driving the designated scan line. The scan line address information is input to a decoder 106 in the scan line drive circuit 104, and the scan electrode designated by the display panel 103 is driven by a scan signal generator 107 through the decoder 106. The display information is supplied to a shift register 108 in the information line drive circuit 105 and is shifted in response to a transfer clock in units of four pixels. When one scan line shift in the horizontal direction is completed by the shift register 108, 1,280-pixel display information is transferred to a line memory 109 arranged in parallel with the shift register 108 and is stored within one horizontal scan interval. The stored information is output from an information signal generator 110 to each information electrode as a display information signal.

Driving of the display panel 103 by the liquid crystal display device 101 is asynchronous with generation of scan line address information and display information by the graphic controller 102. Therefore, the display device 101 must be synchronized with the controller 102 during image information in response to a signal SYNC. The signal SYNC is generated by the drive control circuit 111 in the liquid crystal display device 101 every horizontal scan interval. The graphic controller 102 always monitors the signal SYNC. When the signal SYNC is set at low level, image information transfer is performed. However, when the signal SYNC is set at high level, no transfer is performed at the end of transfer of the image information of one horizontal scan line. That is, when the graphic controller 102 detects that the signal SYNC goes low in FIG. 2, the signal AH/DL is set at high level to start transfer of the image information of one horizontal scan line. The drive control circuit 111 in the liquid crystal display device 101 sets the signal SYNC at high level during transfer of the image information. After write access of the display panel 103 through one predetermined horizontal scan interval, the drive control circuit (FLCD controller) 111 sets the signal SYNC to low level again and can receive image information of the next scan line.

Figure 3:
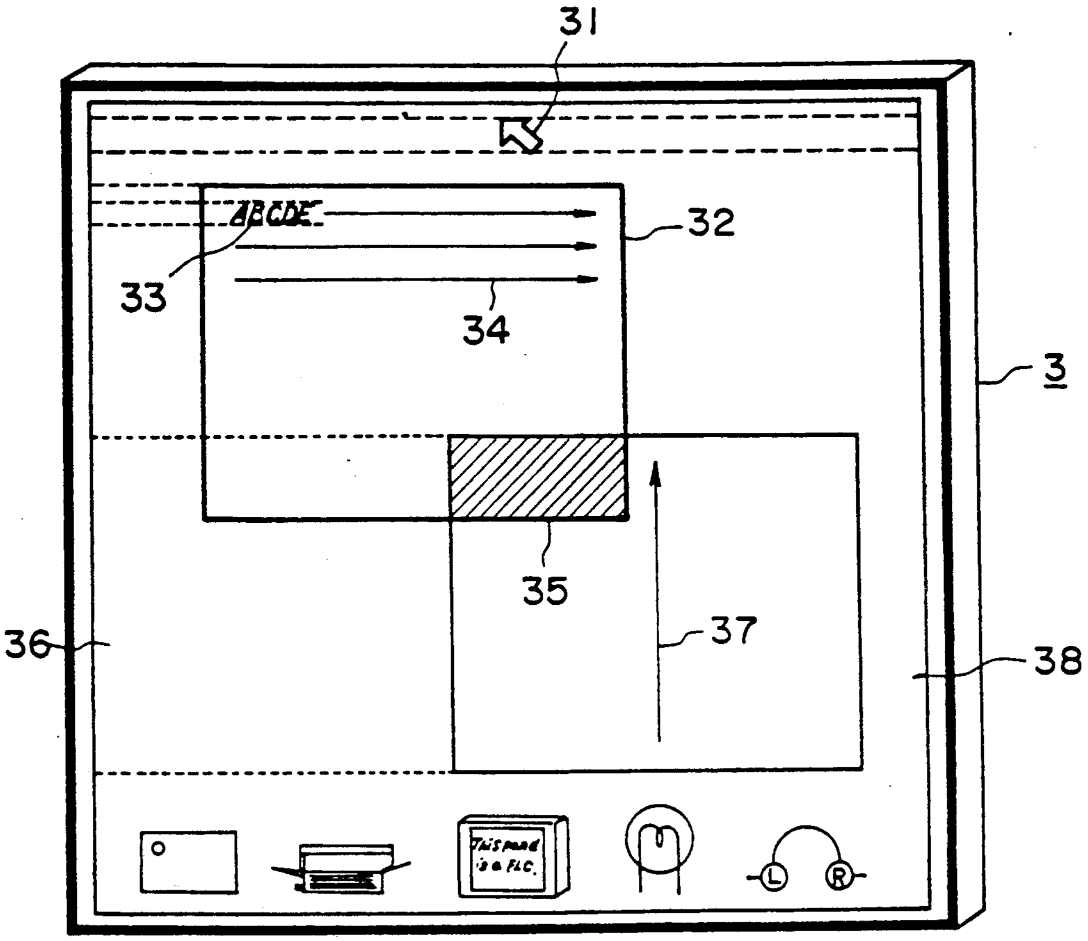
FIG. 3 is a view showing a display screen to illustrate a plurality of graphic events.

FIG. 3 shows a display screen 3 obtained when a display request for a plurality of pieces of display information is made in a multi-window, multi task system.

| | |
|---|---|
| Display request 31: | a request for smoothly moving a mouse font obliquely |
| Display request 32: | a request for selecting a given window as an active screen and displaying a portion overlapping the previous window as a front layer |
| Display request 33: | a request for inserting a character input from a keyboard |
| Display request 34: | a request for moving a previous character (character shift to a direction of an arrow) |
| Display request 35: | a request for changing a display of an overlap area |
| Display request 36: | a request for displaying a non-active window |
| Display request 37 | a request for scrolling and displaying the non-active window |
| Display request 38: | a request for displaying a |

-continued

| |
|---|
| full image field |

Table 1 below represents a display priority order of graphic events corresponding to display requests 31 to 38.

TABLE 1

| | Graphic Event | Drive Mode | Display Priority Order | Drawing Operation |
|---|---|---|---|---|
| 31 | mouse shift display | partial update | highest level | |
| 32 | active window area ON | | | logical access area |
| 33 | character insertion display | partial update | second level | |
| 34 | character shift display | partial update | third level | |
| 35 | overlap area display change | | | logical VRAM operation |
| 36 | non-active window area ON | | | logical access area |
| 37 | non-active window area scroll display | partial update | fourth level | |
| 38 | full image field display | multi-field refresh | lowest level | |

The "partial update" in Table 1 represents a drive scheme for scanning only scan lines of a partial update area, and the "multi-field refresh" represents a one-frame scan scheme by scanning N fields (N=2, 4, 8, . . . , $2^N$) in multi-interlaced scanning (drive scheme described in U.S. patent application Ser. 271,240 filed on Nov. 4, 1988). The "display priority order" represents an order designated beforehand. In this embodiment, operability of the man-machine interface has the top priority, so that graphic event 31 (i.e., mouse shift display) has the highest priority, and the priority order is lowered in the order of graphic events 33, 34, 37, and 38. The "drawing operation" represents an internal drawing operation in the graphic processor.

The mouse shift display has the top priority because the pointing device aims at quickly (real time) reflecting the will of the operator in the computer. The next important factor is a character input from the keyboard. The character input is generally buffered, and its real-time response is lower than that of the mouse. The screen update within the window as a result of the key input need not always be real-time with the key input. A line subjected to key input operations has a higher priority. A relationship between the scroll display within another window and an overlap area is changed depending on system setup specifications. Line scroll is performed under an active window.

Figure 4:
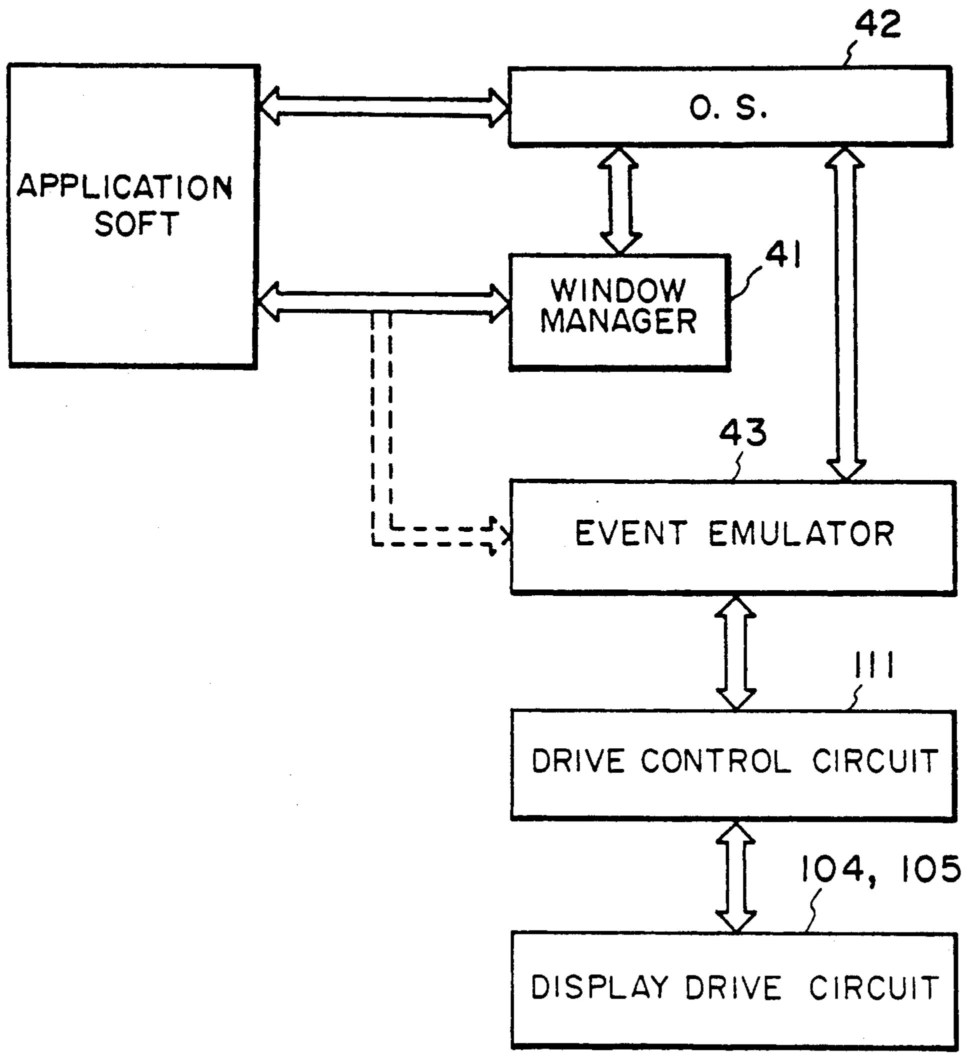
FIG. 4 is a block diagram of a display control program.

According to the present invention, a screen display control program shown in FIG. 4 has a function for accepting external display requests 31 to 38 through the illustrated communication procedures and transferring image information to the ferro-electric liquid crystal display device (FLCD) 101 shown in FIG. 1A. Once a display content update request is generated, the screen display control program determines an update area and drawing processing of the VRAM (image information memory) required for this updating in accordance with the display priority order, and selects image information to be sent to the display device 101 and then transfers them thereto in synchronism therewith.

A window manager 41 and an operating system (OS) 42 are used in the communication procedures in FIG. 4. An "MS-DOS" (tradename) or a "XENIX" (tradename) available from Microsoft Corp., U.S.A., a "UNIX" (tradename) available from AT & T, U.S.A., or an "OS/2" (tradename) available from Microsoft Corp., U.S.A. can be used as the operating system (OS) 42. An "MS-Windows ver 1.03" or "ver 2.0" (tradename) available from Microsoft Corp., U.S.A., an "OS/2 Presentation Manager" available from Microsoft Corp., U.S.A., an "X-Window" as a public domain, or a "DEC-Window" (tradename) available from Digital Equipment Corp, U.S.A. can be used as the window manager 41. An event emulator 43 may comprise an "MS-DOS & MS-Windows" or "UNIX & X-Window".

The partial update used in the present invention is to scan only scan lines of a partial update area. Since the FLCD has a memory function, high-speed partial update can be performed. The present invention presumes that high-speed update of display information by the computer system on the full image field is not frequently performed as instantaneous operations. For example, information from, e.g., a pointing device (=mouse or the like) need only be displayed at a speed of 30 Hz or less. If the speed is higher than the speed of 30 Hz, human eyes cannot catch the movement of the cursor. Similarly, if the speed of smooth scroll (scroll of each line) which requires a display of the highest speed is too high, human eyes cannot catch the scrolled contents. Scrolling is often performed not in units of lines but characters in practice, or performed in units of blocks. The scroll function is often used in document editing in a computer system. Scrolling does not aim at smooth scrolling but at a shift from one line to another line. In this sense, a sufficient scroll speed is 10 lines/sec in units of lines in practice.

When a mouse font has a 32×32 dot format and partial update scan for the FLCD is performed in accordance with non-interlaced scan, the following response speed can be obtained:

$$32\ lines \times 100\ \mu sec/line = 3.2\ msec \cong 312\ Hz \quad (1)$$

Line scrolling at 10 lines/sec corresponds to an image update speed at a non-interlaced scan frequency of 10 Hz. Although flickering occurs at a frequency of 10 Hz, strictly speaking, a change in movement of information in units of lines is larger than the magnitude of flickering, thus posing no practical problems. The number of scan lines to be non-interlaced scanned during scrolling in units of lines is given as follows:

$$(1/10\ Hz)/100\ \mu sec = 1{,}000\ (lines) \quad (2)$$

According to the present invention, a data format consisting of the image information having scan line address information and the communication sync means using the signal SYNC are used to realize a liquid crystal display apparatus based on the partial update scan algorithm in the graphic controller to be described below.

Figures 1, 9A:
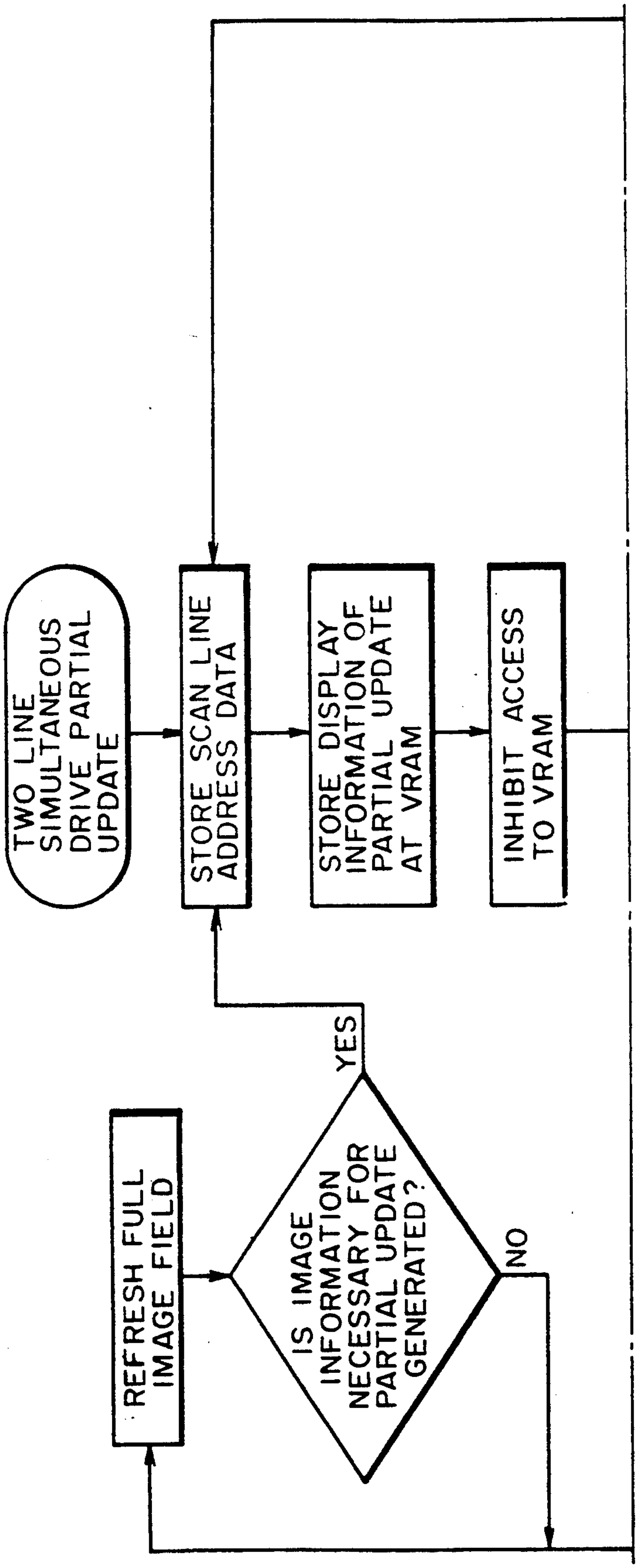
FIGS. 9A and 9B show a partial update algorithm of a two-line simultaneous access waveform according to the present invention.
Figures 2, 9A:
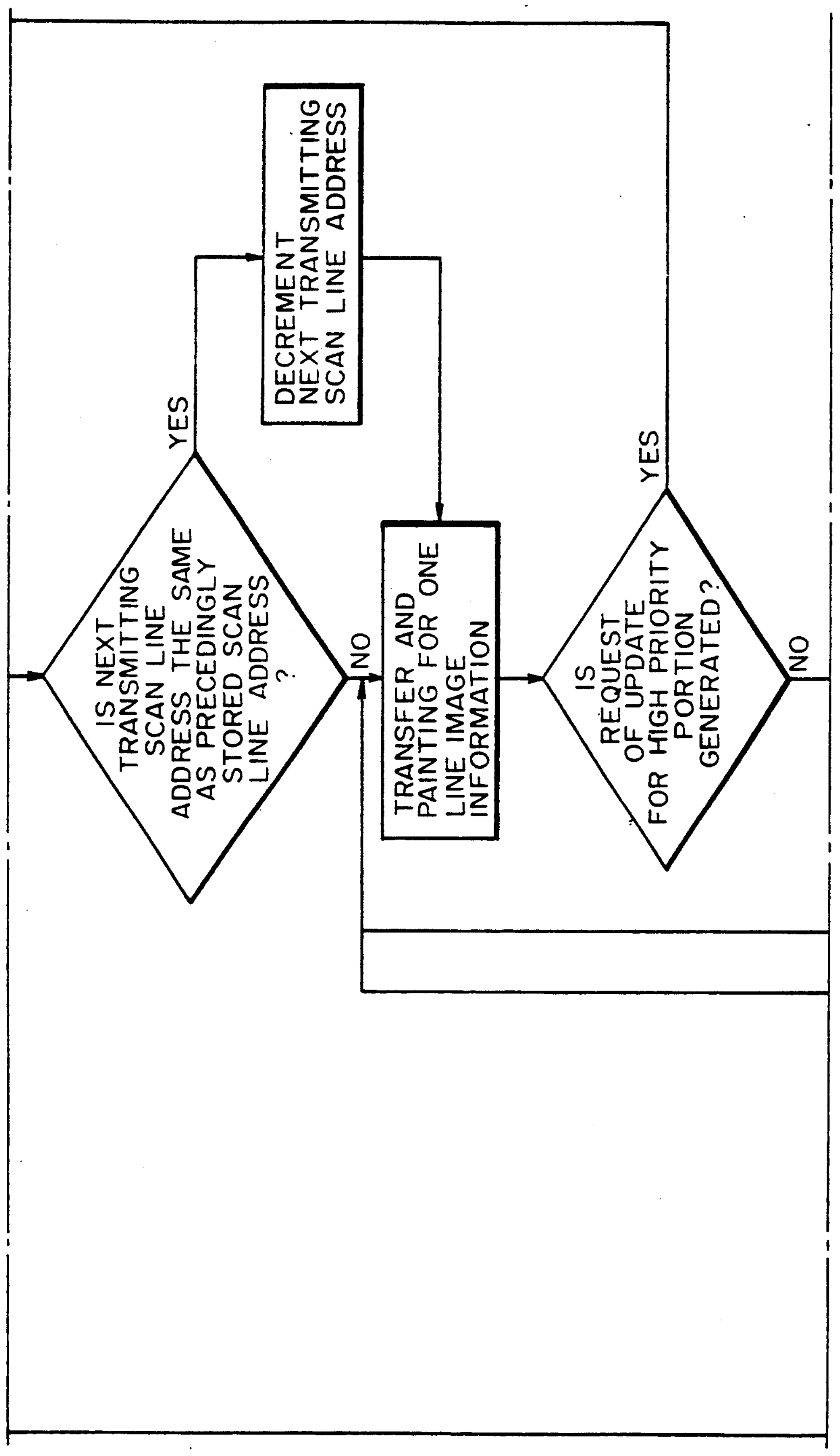
Figure 9A:
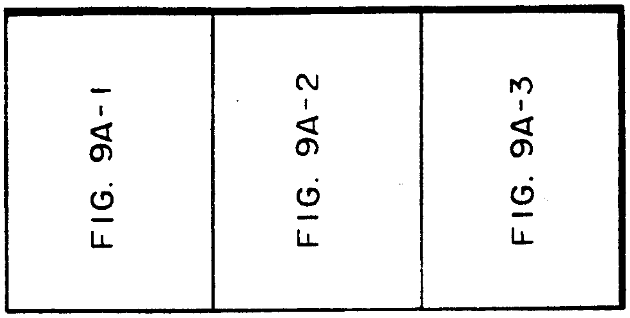
Figures 3, 9A:
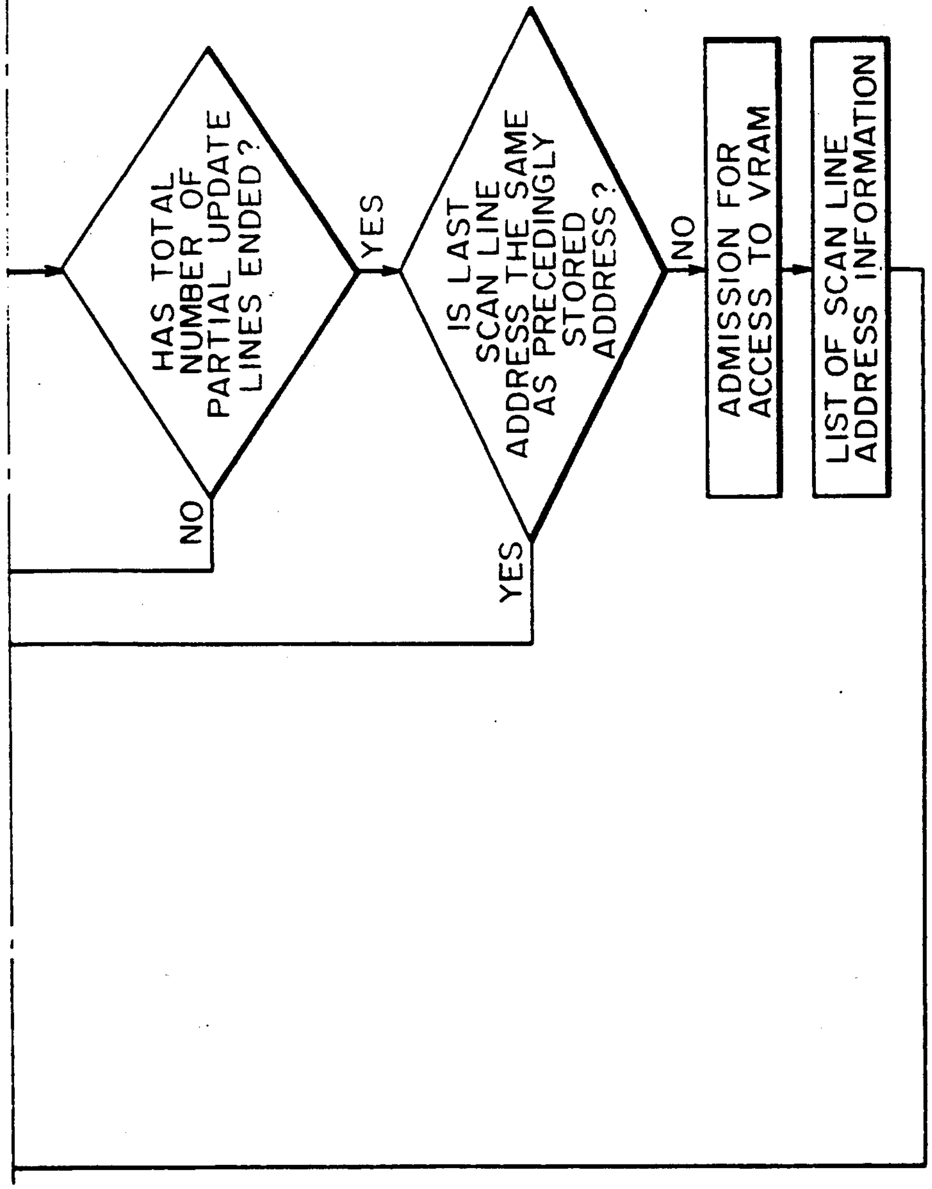

The image information is generated by the graphic controller 102 in the main unit and is transferred to the display panel 103 by the signal transfer means shown in FIGS. 1A and 2. The graphic controller 102 uses a CPU (Central Processing Unit to be referred to as a GCPU 112 hereinafter) and a VRAM (image information memory) 114 to control management and communication between a host CPU 113 and the liquid crystal display device 101. The control method of the present invention can be mainly realized by the graphic controller 102.

FIG. 9A shows a partial update algorithm in a two-line simultaneous drive mode. Display information (e.g., a pointing device and a pop-up menu) necessary for partial update on the ferro-electric liquid crystal display device is registered in a graphic microprocessor beforehand. When partial update of information from the host CPU 113 is required, the partial update routine is started.

In the partial update routine, a scan line address (i.e., a scan line address corresponding to the last scan in refresh scan prior to partial update or in partial update scan for performing an intrawindow scroll display) prior to routine branching, and a remaining scan line count are stored in a register prepared beforehand in the graphic microprocessor. These data are used to restore the normal refresh routine or the partial update for the intrawindow scroll display. Partial update image information is stored in the VRAM 114. In this case, the host CPU 113 is allowed to access the VRAM 114 through the graphic microprocessor 112. The storage state address and a storage area of the partial update image information in the VRAM 114 are managed by the graphic microprocessor 112. Upon completion of storage of the image information in the VRAM 114, access to the VRAM 114 is inhibited to check that the previously saved scan line address is different from the partial update start scan line address. In this case, since the two-line scan is performed [while the Nth scan line is driven for write access, the $(N+\alpha)$th ($\alpha>1, 2, \ldots$) scan line is driven for erasure], the partial update start scan line address is decremented or incremented by one so as to prevent the information on the same line from being continuously transmitted if the scan line addresses are the same. Transfer of image information to the ferro-electric liquid crystal display device 101 is started. While the graphic microprocessor 112 monitors a request of high priority partial update, it transfers one-line partial update image information in the form complying with the above signal transfer scheme. At the end of image transfer in the partial update mode, the graphic microprocessor 112 checks that the scan line address saved at the start of partial update is different from the scan line address of the partial update last line, thereby allowing access of the VRAM 114 and hence completing the partial update routine.

When the two-line simultaneous drive waveform is used to increase the frame frequency in the ferro-electric liquid crystal display device 101, the graphic microprocessor monitors the transfer scan line address within the partial update routine, thereby preventing continuous transfer of image information on the same scan line address.

Figure 5A:
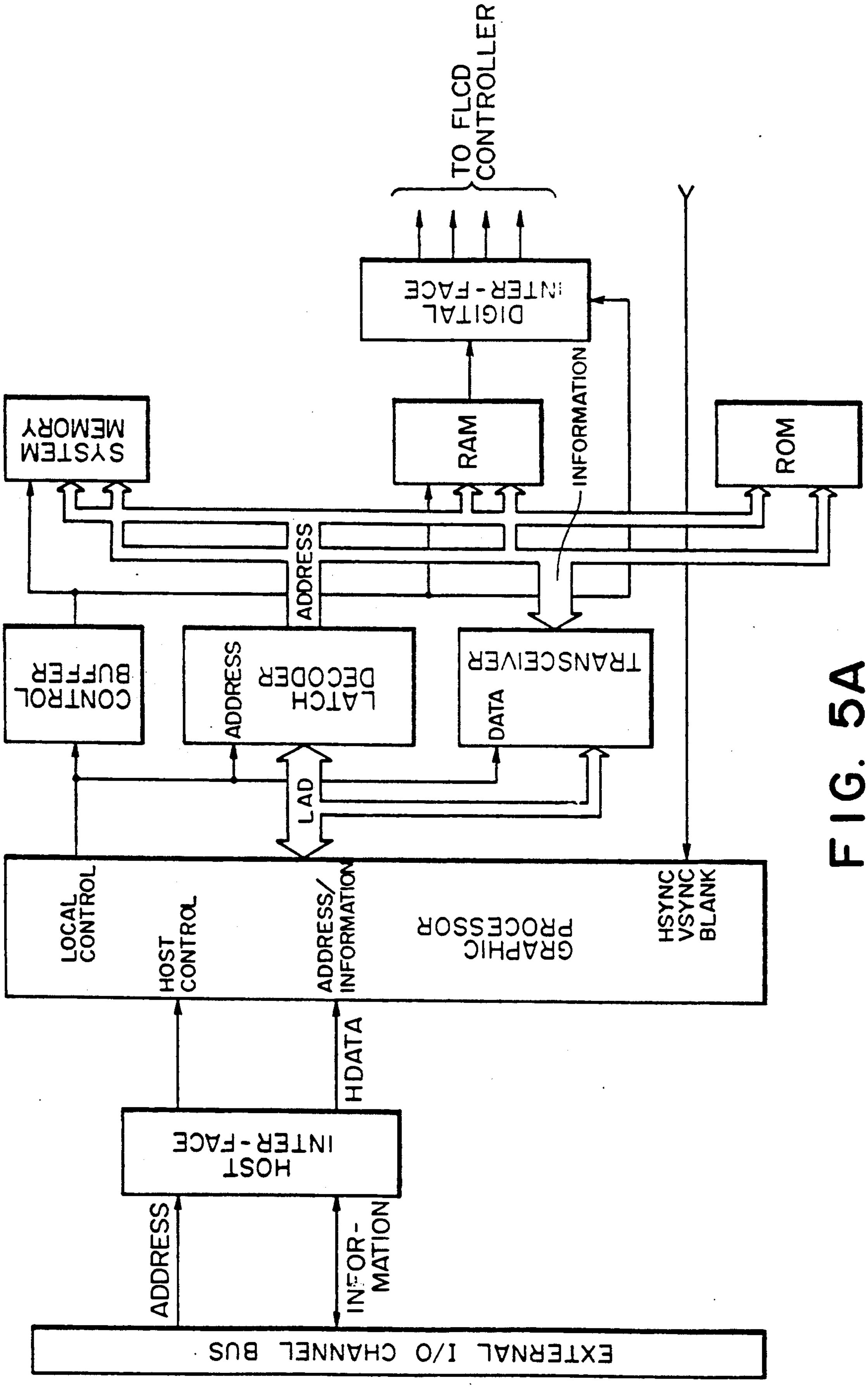
FIGS. 5A and 5B are block diagrams of the graphic controller used in the present invention.
Figure 6:
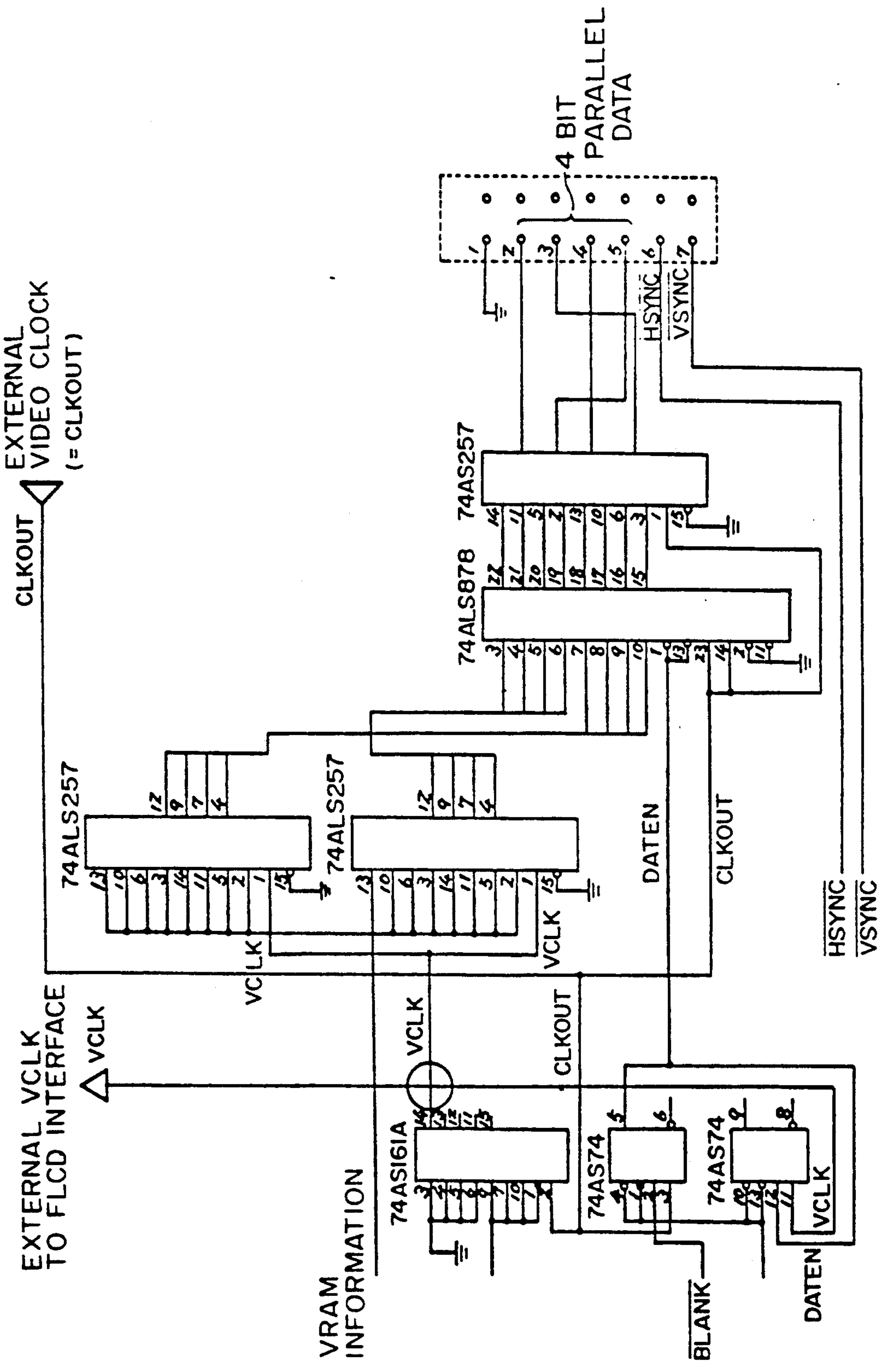
FIG. 6 is a block diagram of a digital interface.
Figure 7:
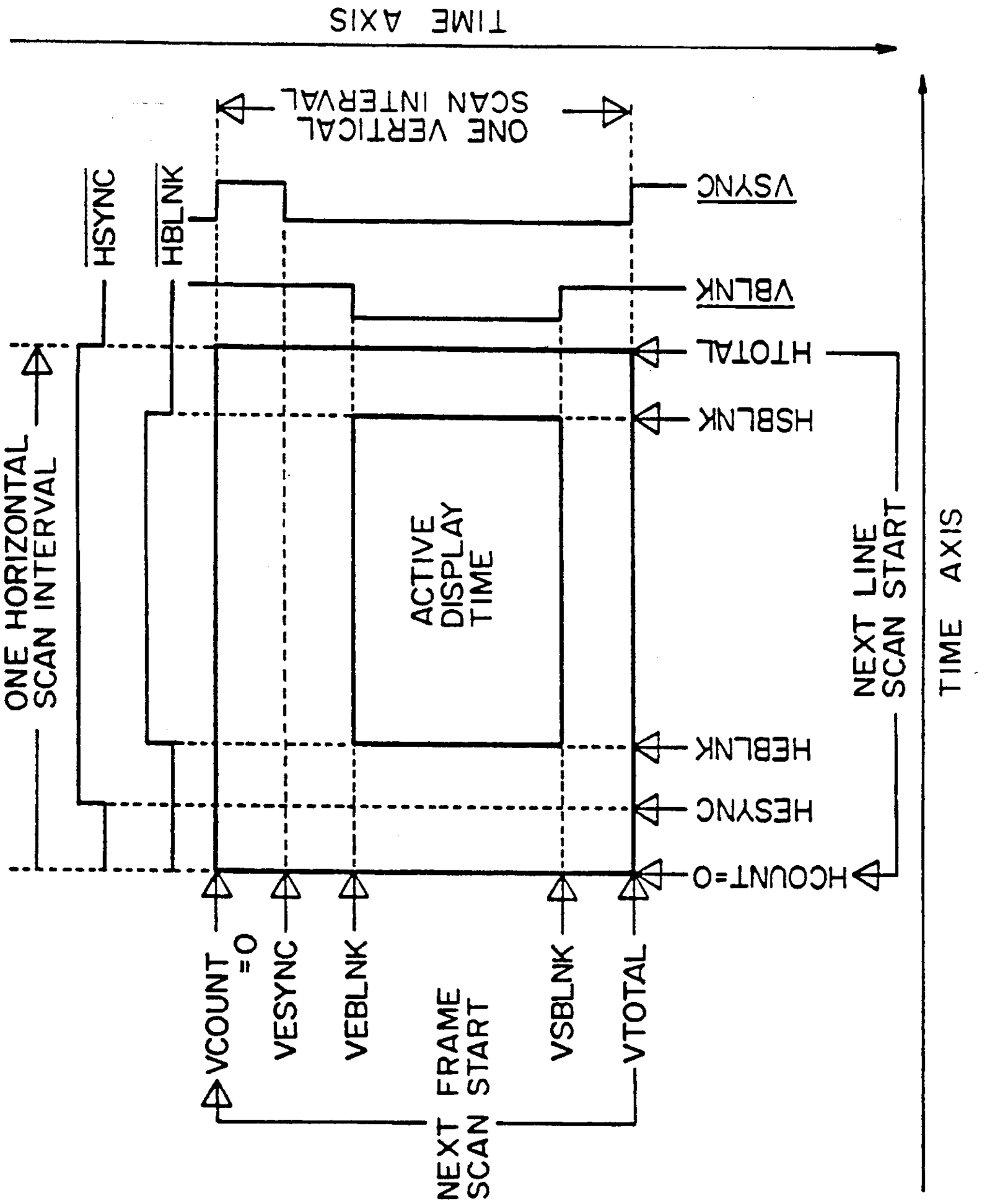
FIG. 7 is a timing chart of an interface for a display drive unit.
Figures 8A, 8B, 8C, 8D, 8E, 8F, 8G, 8H, 8I:
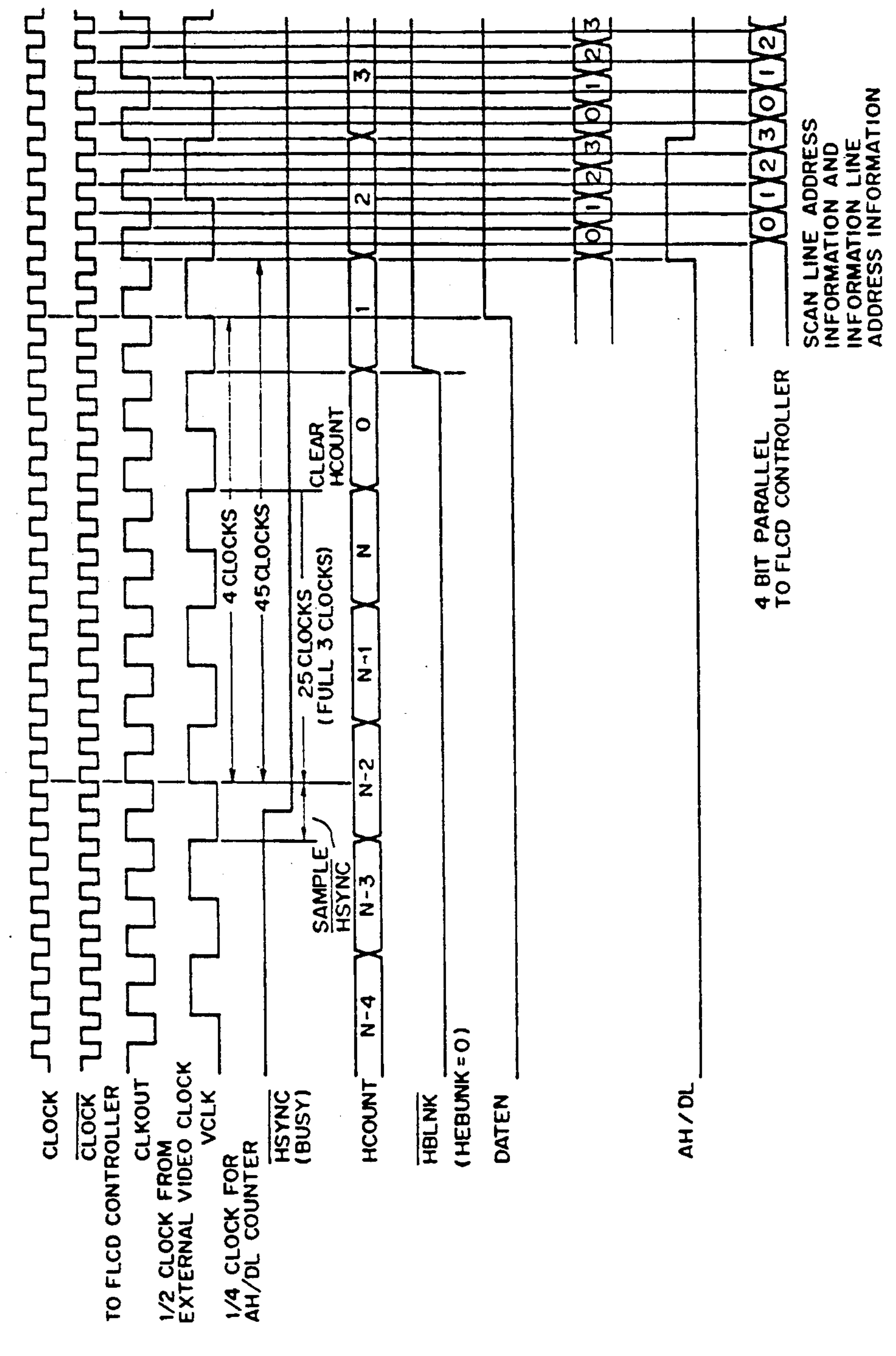
FIGS. 8A to 8I are timing charts of an interface for an FLCD controller.

FIG. 5A is a block diagram of the graphic controller 102, FIG. 6 is a block diagram of a digital interface, and FIGS. 7 and 8 are timing charts of information transfer.

The graphic controller 102 used in the present invention is greatly different from a conventional controller in that a graphic processor 501 has its own system memory 502, and performs execution and management of a drawing instruction for a RAM 503 in addition to management of the RAM 503 and a ROM 504, and information transfer from a digital interface 505 to the FLCD controller and management of a drive method of the FLCD can be independently programmed.

The digital interface 505 shown in FIG. 6 sends information from the VRAM in the form of 5 bits/clock (clock=data transfer clock) in the last stage in synchronism with the drive circuits 104 and 105 of the display panel 103 in response to an external sync signal $\overline{HSYNC}$ /$\overline{VSYNC}$ from the FLCD controller 111. FIG. 7 shows timings of full image field update of the FLCD. Parameters in FIG. 7 are the same as those in the timing chart of information transfer of FIG. 7. One-line image information transfer is started when the signal $\overline{HSYNC}$ (FIG. 8) becomes active (low level in this case, i.e., active low). The signal $\overline{HSYNC}$ is set at low level by the FLCD controller 111, and the signal $\overline{HSYNC}$ of low level represents an information request from the panel 103. The information request from the panel 103 is received by the graphic processor 501 in FIG. 5 and is processed herein at timings shown in FIGS. 8A to 8I. In the timing charts of FIGS. 8A to 8I, the signal $\overline{HSYNC}$ of the information request from the panel 103 is sampled within one period (in other words, a low interval of a signal VCLK) of an external video clock (CLKOUT) (in this case, the signal VCLK is actually input to the graphic processor 501, and the processor 501 samples during the low interval). A horizontal counter HCOUNT of the processor 501 is cleared after a lapse of 2.5-clock interval of the signal VCLK. The parameters HESYNC and HEBLNK in FIG. 7 are programmed to disable (high level) a signal $\overline{HBLNK}$ of FIG. 7 and FIGS. 8A to 8I prior to HCOUNT=1. In the circuit of FIG. 6, a signal DATEN goes active (high) after a lapse of a ½-clock interval of the signal VCLK, as shown in FIGS. 8A to 8I. After a further lapse of a ½-clock interval, i.e., after a lapse of a 4.5-clock interval judging from sampling of the signal $\overline{HSYNC}$, the next one-line data is transferred from the VRAM to the FLCD controller 111 every 4 bits.

Line information transferred in this case is transferred, as indicated in the lower right portion of FIGS. 8A to 8I. More specifically, scan line address information (i.e., corresponding to a scan line number) is sent every 4 bits, and then the original one-line display information is transmitted. In this case, the FLCD controller 111 uses the signal AH/DL to distinguish the scan line address information from the display information. When the signal AH/DL is set at high level, it represents the scan line address information. However, when the signal AH/DL is set at low level, it recognizes the display information. Therefore, the FLCD selects a scan line in accordance with the scan line address information and is written with the display information. When the scan line address information from the graphic controller of FIG. 5A is sent upon being incremented by one, the FLCD is driven by interlaced scan when the number of scan lines is incremented every other number, or the FLCD is driven by m-line multi-interlaced scan when the number of scan lines is incremented every m lines. Therefore, the drive method of the display can be controlled.

Figure 1B:
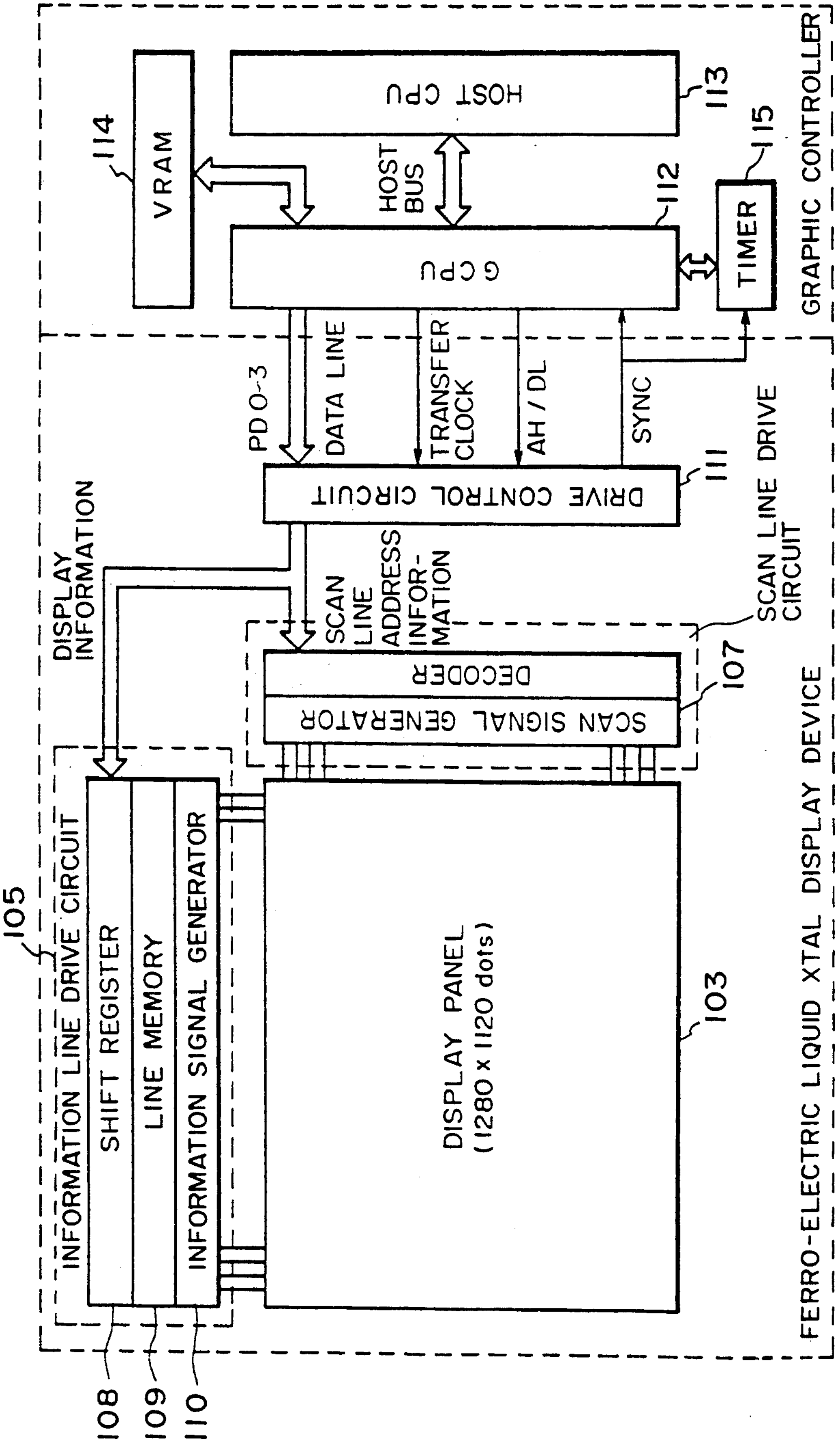
Figures 2A, 2B, 2C, 2D, 2E, 2F, 2G:
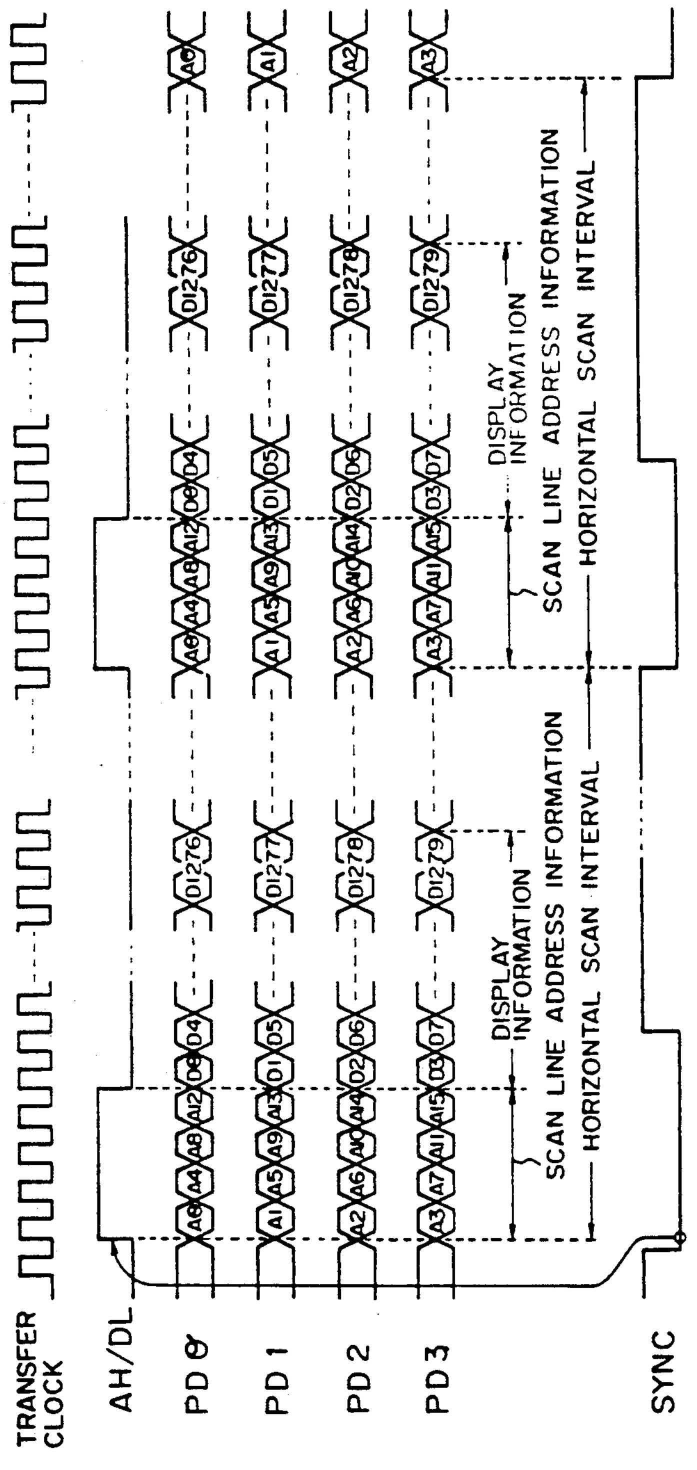
FIGS. 2A to 2G are timing charts of image information communication between the ferro-electric liquid crystal display device and the graphic controller.
Figures 1, 9B:
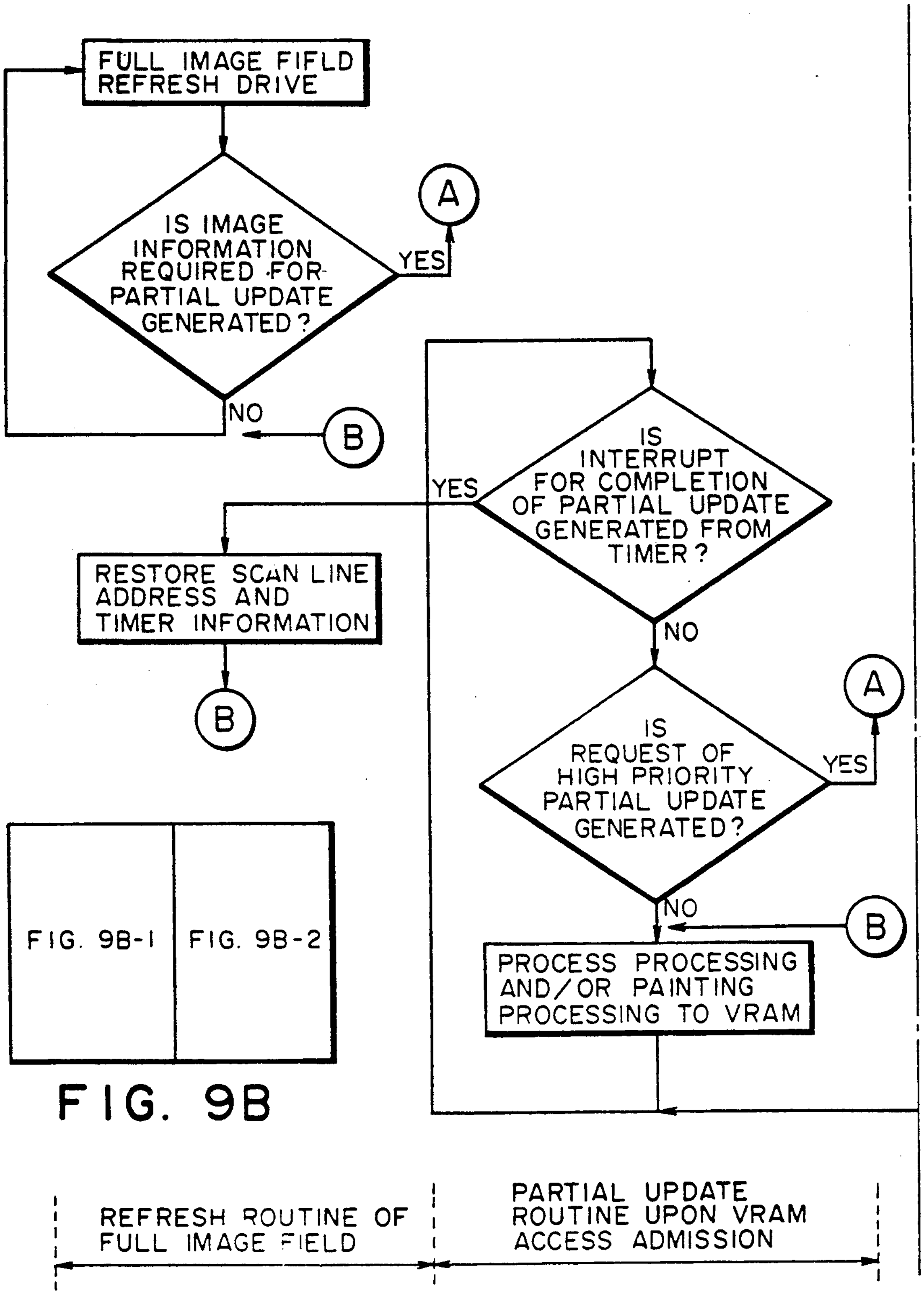
Figures 2, 9B:
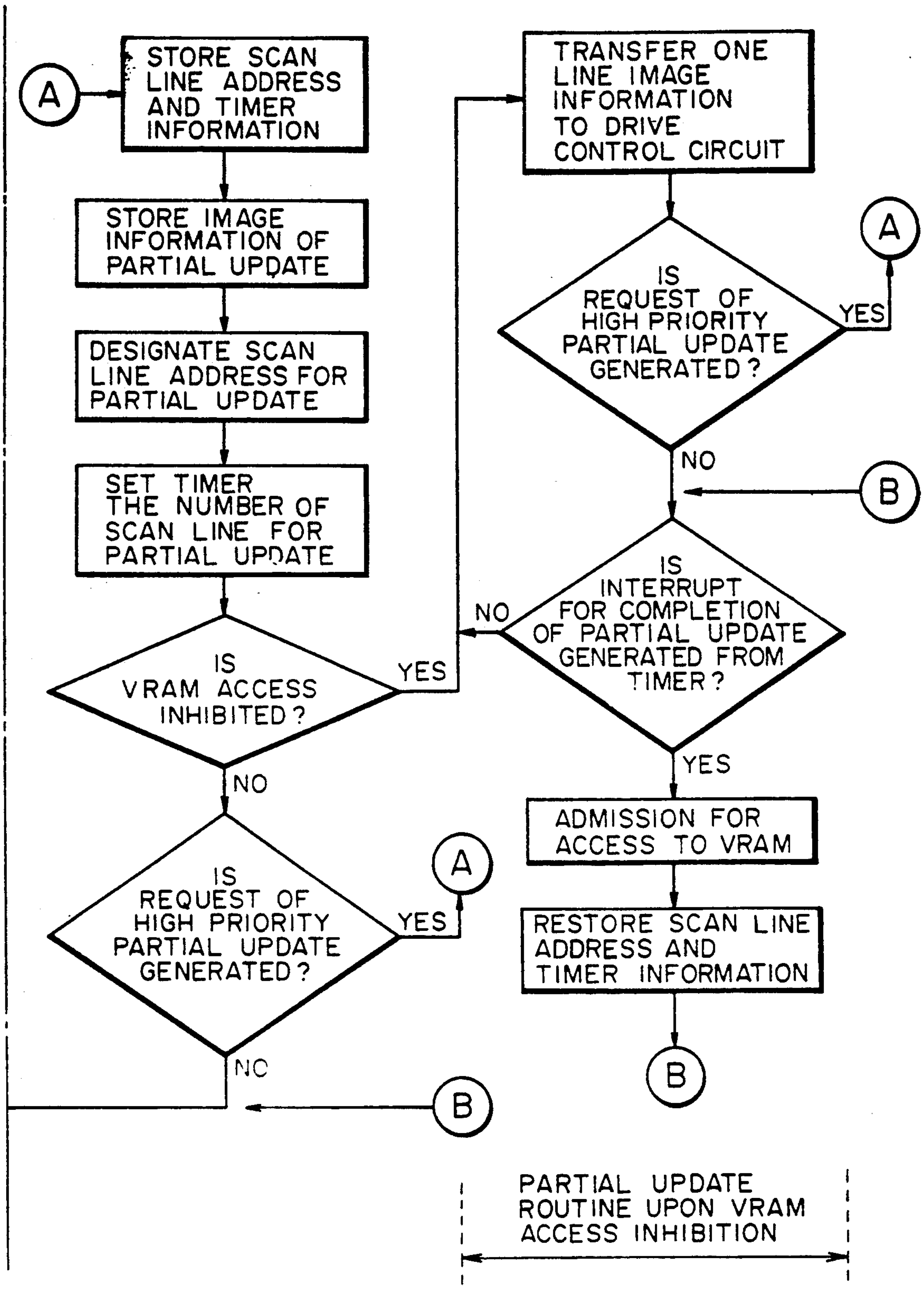
Figure 10:
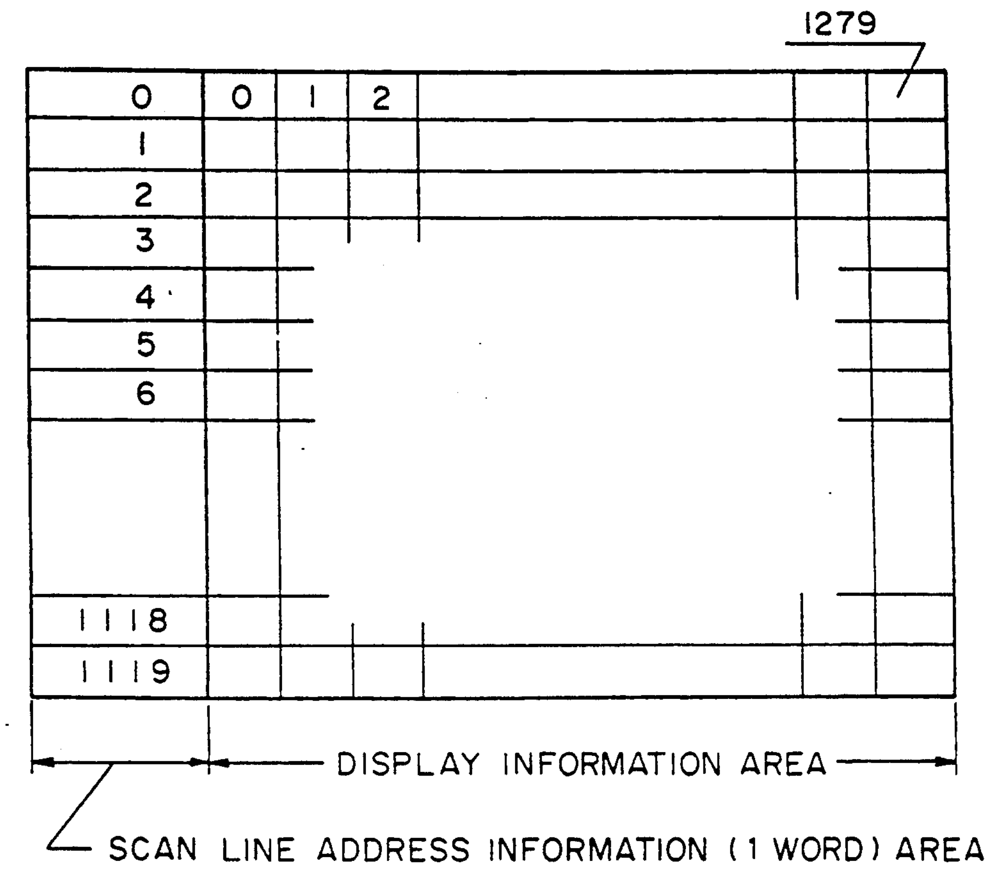
FIG. 10 is a view for explaining data mapping between scan line address information and display information in the VRAM.

FIG. 9B shows another partial update algorithm according to the present invention. The corresponding system of the present invention is shown in FIG. 1B. The arrangement shown in FIG. 1B is obtained by adding a timer 115 to the system shown in FIG. 1A.

In this partial update routine, the scan line address prior to branching (generation of a request of high priority partial update, i.e., (A)) shown in FIG. 9B and a remaining scan line count are saved in a register prepared beforehand in a GCPU 112 as information for restoring a normal refresh routine after the end of partial update. The partial update image information is stored in a VRAM 114. In this case, a host CPU 113 is allowed to access the VRAM 114 only through the GCPU 112. The storage state address and the storage area of the partial update image information are managed by the GCPU 112.

At the end of storage of the image information in the VRAM 114, in order to synchronize storage of the image information in the VRAM 114 with partial update scan of the display panel 103, the number of partial update scan lines is set in a timer 115. The timer counts down the set number of partial update scan lines. When the count reaches the set number of partial update scan lines, an interrupt is sent to the GCPU 112. The GCPU 112 inhibits or allows access of the VRAM 114 in accordance with types of graphic events of the image information until the interrupt is generated from the timer 115. When an access of the VRAM 114 is inhibited, transfer of the image information to a drive control circuit 111 is started in units of lines in the form complying with the above signal transfer scheme. When a request of high priority partial update is not generated, the image information is transferred to the drive control circuit 111 until an interrupt representing the end of partial update scan is generated by the timer 115. When transfer of the partial update information is completed, the GCPU 112 allows access of the VRAM 114 to restart refresh driving.

When an access of the VRAM 114 is allowed and a request of high priority partial update is not generated, the GCPU 112 manages and executes process processing (e.g., storage of font information in a RAM (not shown) except for the VRAM 114, and communication with the host CPU 113) and image information storage processing (e.g., scroll which does not result in a failure even if information from the VRAM 114 is changed during processing). When the interrupt from the timer 115 is received by the GCPU 112, front-layer refresh driving is started.

In the information processing system of the present invention, the partial update scan interval on the display panel 105 is managed by controlling a scan interval (i.e., (number of partial update scan lines) x (horizontal scan interval)). New image information can be stored in the VRAM 114 without interfering synchronization between partial update scan under execution and the VRAM 114 within the update interval.

When a partial update of image information occurs, the timer 115 manages the number of partial update scan lines to synchronize the partial update scan of the panel 103 with storage of the image information in the VRAM 114. At the same time, execution of processing in which access of the VRAM 114 is not inhibited can be performed with the partial update. The processing speed of the GCPU 112 can be increased.

Figure 5B:
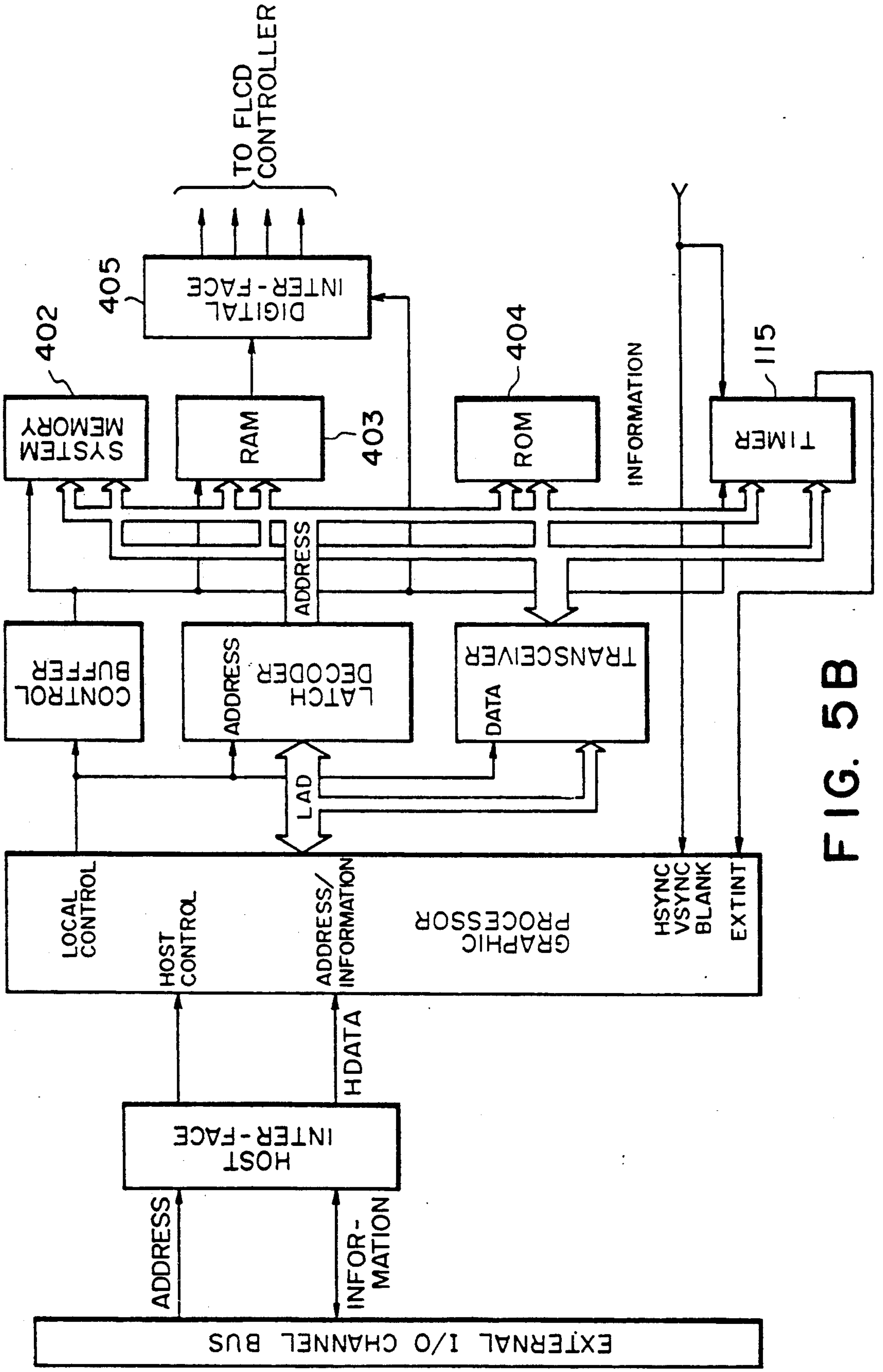

FIG. 5B is a block diagram of the graphic controller 102 when the partial update algorithm shown in FIG. 9B is used. The graphic controller 102 used in the present invention is greatly different from a conventional one in that the graphic processor itself has a system memory 402, and performs execution and management of a drawing instruction for a RAM 403 in addition to management of the RAM 403 and a ROM 404, information transfer from a digital interface 405 to the FLCD controller and management of the drive method of the FLCD can be independently programmed, and the timer 115 can manage the information transfer to the FLCD controller.

Figure 11:
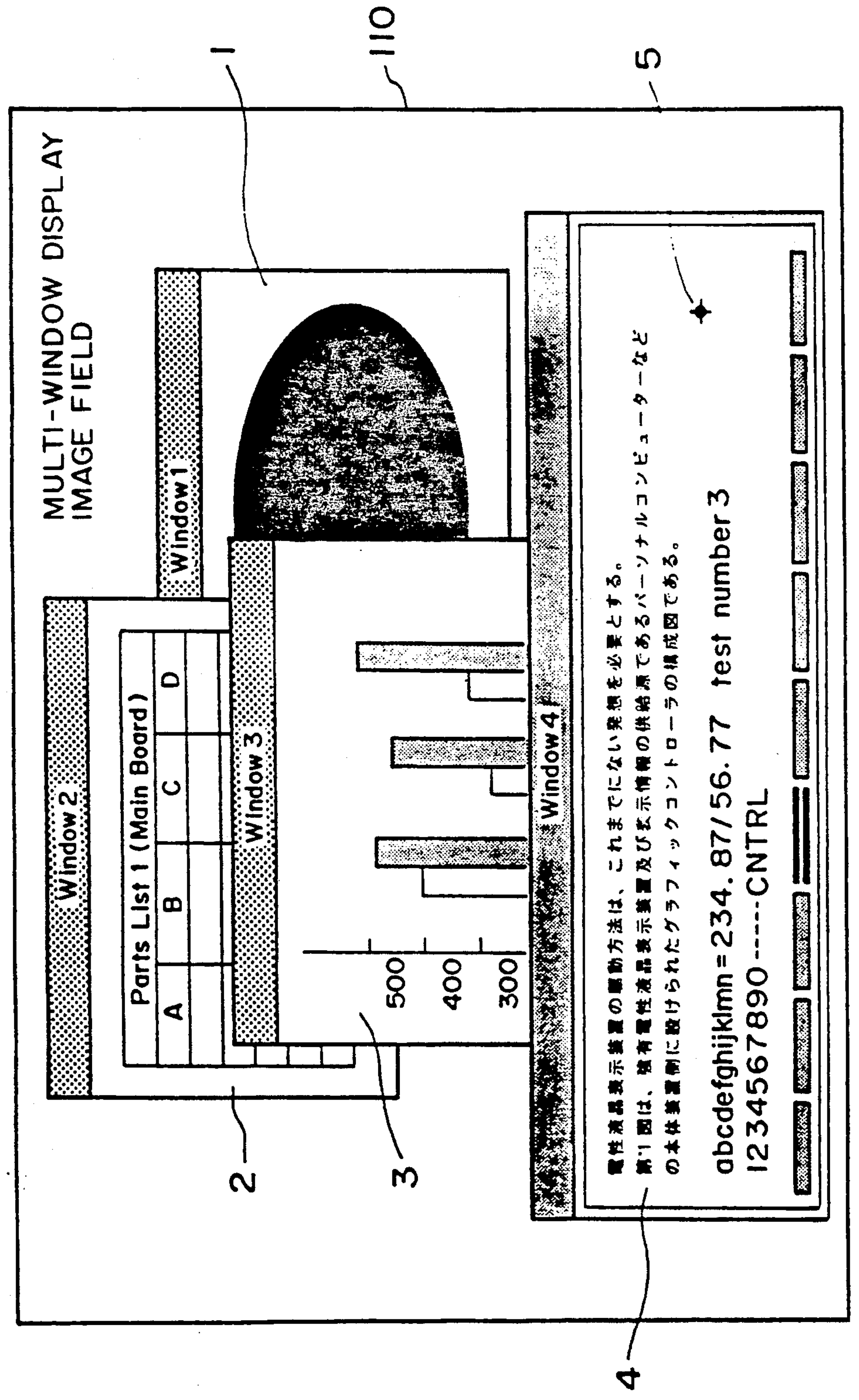
FIG. 11 is a view showing a multi-window display screen.

FIG. 11 shows a multi-window display screen 110 according to the present invention. Window 1 represents a layer obtained by expressing a summation result in a circle graph. Window 2 represents a layer obtained by expressing the summation result of window 1 in a table. Window 3 represents a layer obtained by expressing the summation result of window 1 in a bar graph. Window 4 represents a layer during documentation. A mouse of a pointing device is represented by reference numeral 5. Windows 1 to 3 are kept in a still state. Assume that document editing operations such as smooth scroll, insertion, deletion of words and clauses, and block shift are performed and the mouse 5 is moved. Smooth scroll and mouse shift use partial update scan as necessary information in the ferro-electric liquid crystal display device 101. When the full image field is constituted by 1,120 scan lines and is scanned with one horizontal scan time of 80 μs, the frame frequency becomes about 10 Hz, which cannot cope with normal mouse movement (>30 Hz). However, when the algorithm of the present invention is applied to give higher priority to the partial update by the mouse shift than document edit operations on window 4, the mouse partial update routine is initialized upon mouse shift during scrolling, and a mouse write operation is started. At this time, the time required for branching the program into the mouse partial update routine is a maximum of one horizontal scan interval. For example, as exemplified in equation (1), when a font size of the mouse has a 32×32 dot matrix, a period required for writing a mouse on the display panel 103 becomes 3.2 msec. During this period, the scroll operation is disabled. However, this period is very short not to adversely affect the scroll speed. After the mouse is written, the partial update scan of window 4 is restored. When a mouse shift request is generated again, the main flow is immediately branched into the mouse partial update routine, and the mouse is written. In this manner, in a display device having a memory function such as the ferro-electric liquid crystal display device 101 and driven at a low frame frequency, the partial update priority is set such that the shift of the pointing device (mouse) has the top priority, thereby realizing the multi-window, multi-task display function.

The drive interval of one scan line in the FLCD is generally about 100 μsec. If the drive interval of one scan line is given as 100 μsec and a minimum frequency free from flickering is given as 30 Hz, no flickering occurs as a still image with the following numbers of scan lines (scan and drive):

For non-interlaced scan scheme:

$$(1/30\ Hz)/100\ \mu sec \cong 333\ (lines) \quad (3)$$

For interlaced scan scheme:

$$(1/30\ Hz)\times 2/100\ \mu sec \cong 666\ (lines) \quad (4)$$

For m-line multi-interlaced scan scheme:

$$(1/30\ Hz)\times m/100\ \mu sec \cong 333\times m\ (lines) \quad (5)$$

According to experiments of the present inventor, it was found that no flickering occurred for m=32. That is, if the display panel 103 has the following number of scanning lines:

$$(1/30\ Hz)\times 32/100\ \mu sec \approx 333\times 32 = 10{,}656\ (lines) \quad (6)$$

a display can be free from flickering. A high-precision flat display panel can be obtained.

"74AS161A", "74AS74", "74ALS257", "74ALS878", and "74AS257" in FIG. 6 are IC numbers, and numerical values in FIG. 6 represent pin numbers.

In a preferred arrangement of the present invention, non-interlaced scan is used as a method of scanning an intrawindow scroll display and a font display. In addition, when a still image is to be displayed, the multi-interlaced scan to be described below is used. Table 2 below represents the multi-interlaced scan, and 1°, 2°, 3°, . . . N° in Table 2 represent codes of scan electrodes from the top to the bottom of the screen.

Figure 12A:
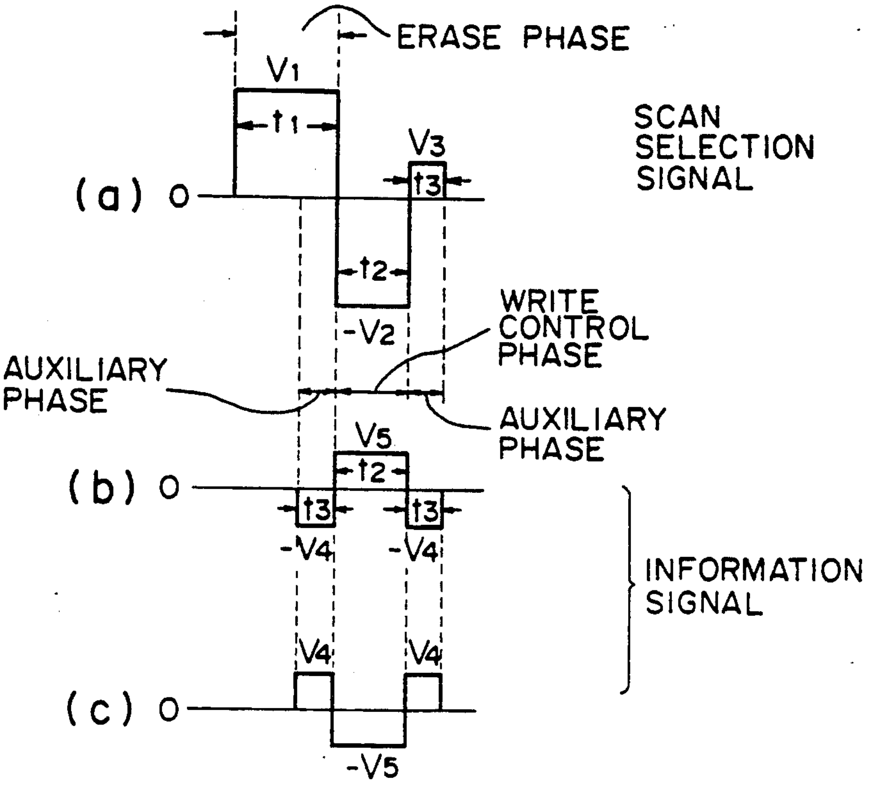
FIG. 12A is a drive waveform char used in the present invention.

FIG. 12A shows waveforms of drive signals in the liquid crystal element of the present invention. More specifically, a waveform a represents a selection signal waveform, and information signal waveforms b and c correspond to white image information and black image information, respectively. In the waveform b, a phase having a pulse width t2 and a voltage value V5 is a control phase, and a phase having a pulse width t3 and a voltage value −V4 is an auxiliary phase. The information signals are constituted by the above pulses to reduce image drawbacks such as flickering during non-selection. The selection signal waveform a consists of an erase phase having a pulse width t1 and a voltage value V1 and an auxiliary phase having a pulse width t3 and a voltage value V3. That is, this auxiliary phase compensates for the auxiliary phase of the waveform b. The voltage value V3 preferably falls within the range of $0<V3<V1$, and $|V3|=|V4|$ is preferably established.

Pixels on a scan line selected in an erase phase are preferably simultaneously erased to obtain a black state.

Figure 12B:
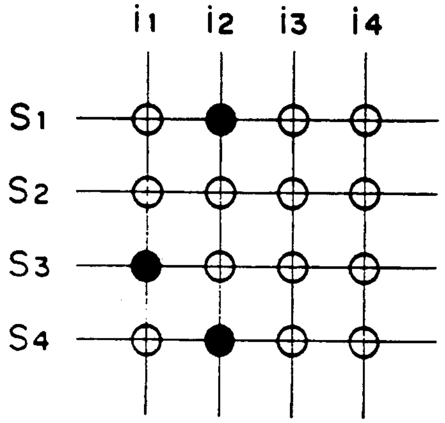
FIG. 12B is a view showing a display state of pixels at that time.
Figure 13:
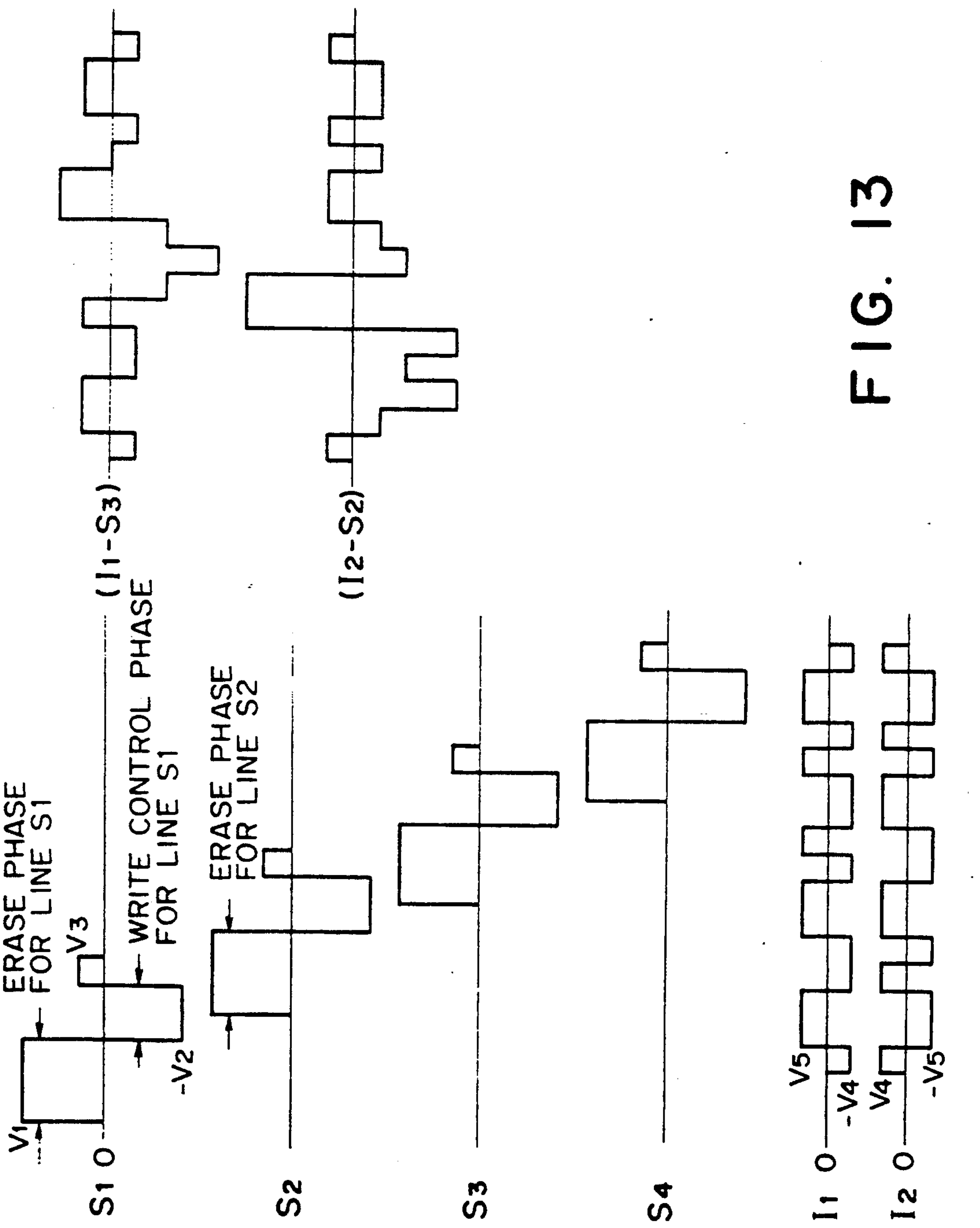
FIG. 13 is a timing chart thereof.

FIG. 13 shows a time-serial waveform when a display of FIG. 12B is performed.

Referring to FIG. 13, scan signal waveforms S1 to S4 correspond to scan signal lines S1 to S4 of FIG. 12B, and information signal waveforms I1 and I2 correspond to information signal lines i1 and i2 of FIG. 12B. Composite waveforms (I1−S3) and (I2−S2) are obtained by combining the information signal waveform I1 and the scan signal waveform S3 and combining the information signal waveform 12 and the scan signal waveform S2, respectively.

The sequence in FIG. 13 is preferable since the frame frequency can be set to be low.

Figure 14A:
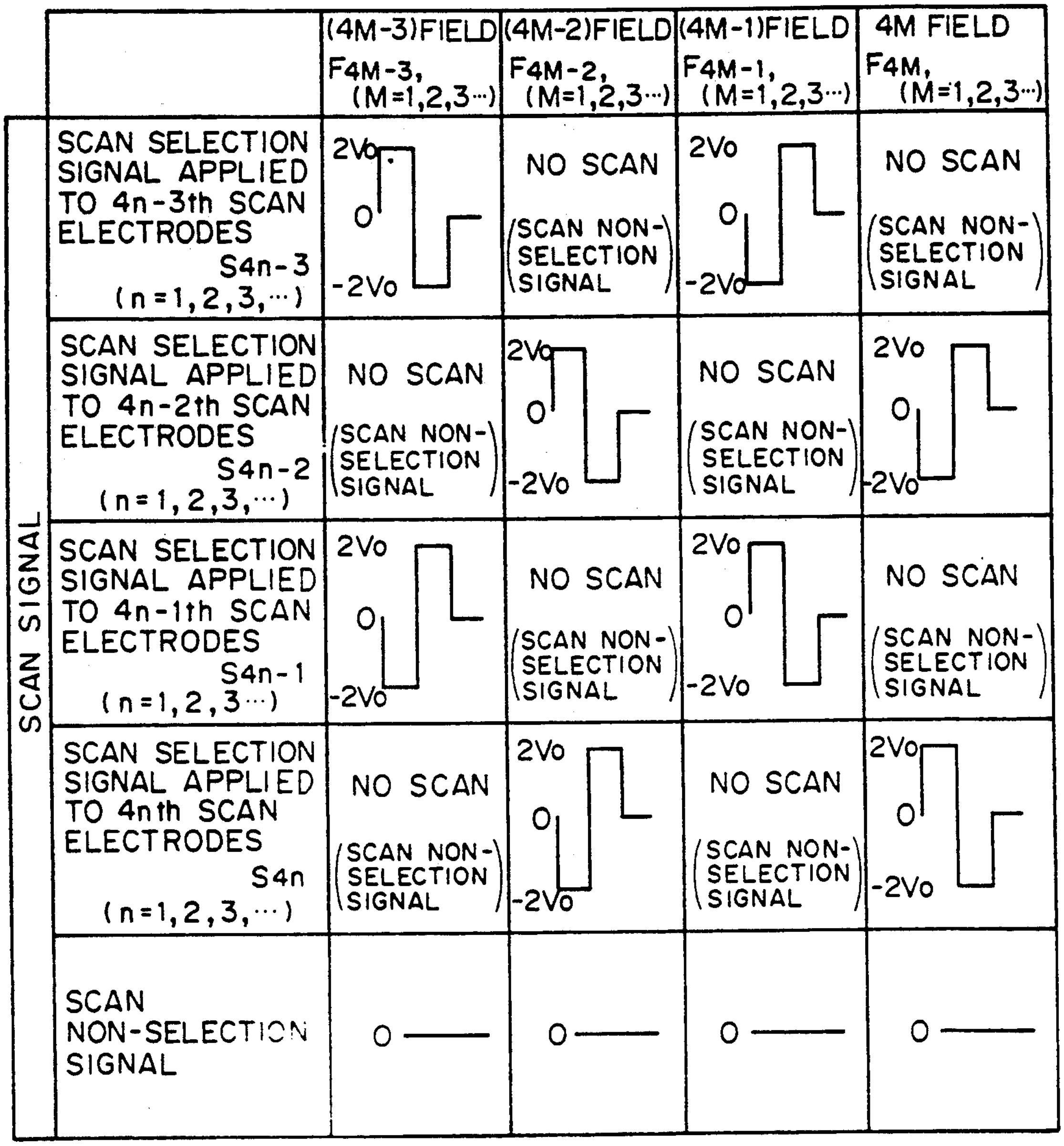
FIGS. 14A and 14B are drive waveform charts used in the present invention.
Figure 14B:
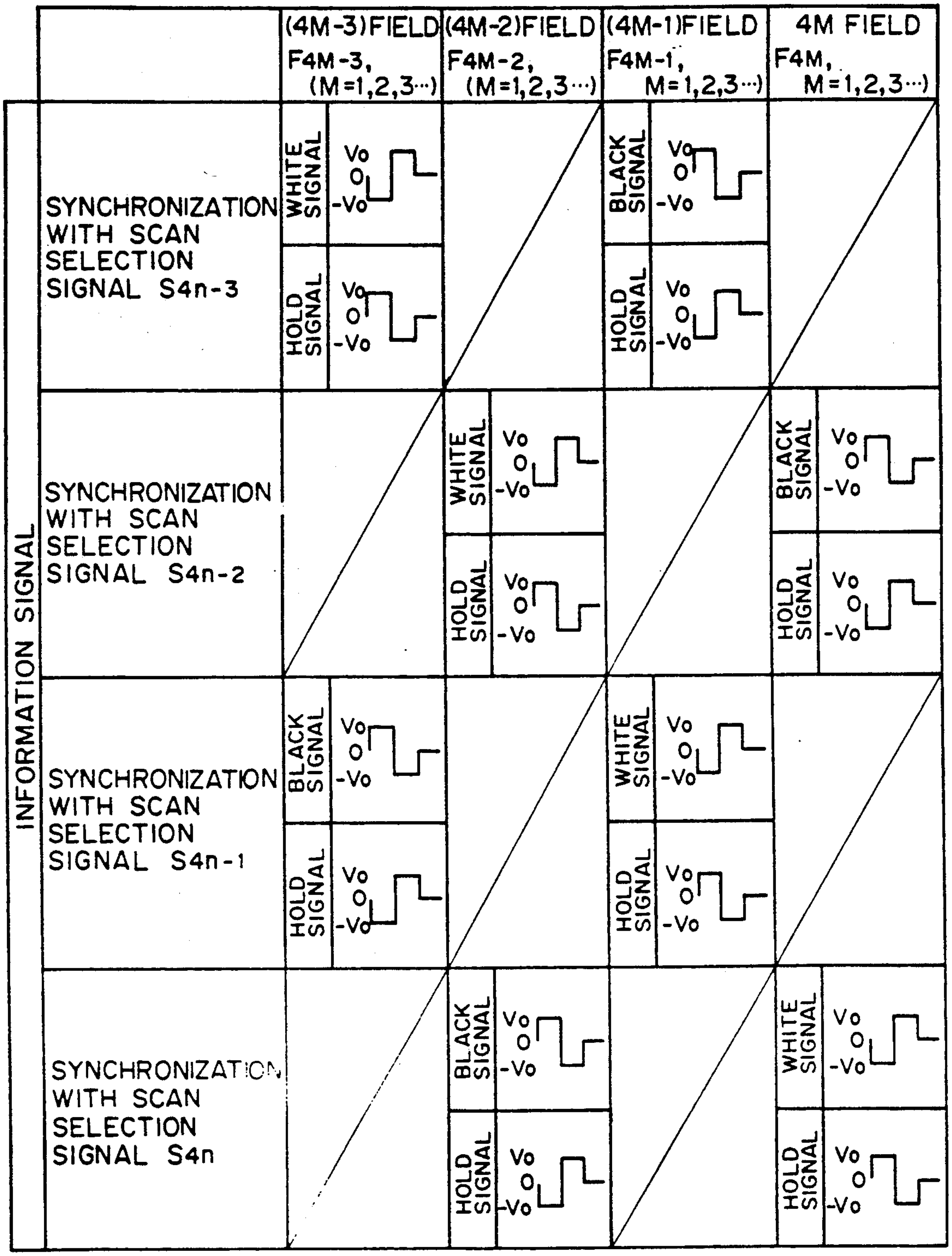

FIGS. 14A and 14B show drive waveforms of a multi-interlaced scan drive scheme used in the present invention. Referring to FIG. 14A, scan selection signals $S_{4n-3}$, $S_{4n-2}$, $S_{4n-1}$, and $S_{4n}$ are applied to the (4n−3)th, (4n−2)th, (4n−1)th, and 4nth scan electrodes in (4M−3)th, (4M−2)th, (4M−1)th, and 4Mth fields $F_{4M-3}$, $F_{4M-2}$, $F_{4M-1}$, and $F_{4M}$ (one field is one vertical scan interval; M=1, 2, 3, . . . ), respectively. Referring to FIG. 14A, the in-phase voltage polarities (voltage polarities with respect to the voltage of the scan non-selection signal) of the scan selection signal $S_{4n-3}$ are opposite to each other. The scan selection signal $S_{4n-3}$ is disabled during scan in the (4M−2)th and 4M fields $F_{4M-2}$ and 4M. The scan selection signal $S_{4n-1}$ is similarly set. In addition, the scan selection signals $S_{4n-3}$ and $S_{4n-1}$ applied within one field interval have different voltage waveforms, and their in-phase voltage polarities are opposite to each other.

Similarly, the in-phase voltage polarities (voltage polarities determined with reference to the voltage of the scan non-selection signal) of the scan selection signal $S_{4n-2}$ are opposite to each other in the (4−M2)th and 4Mth fields $F_{4M-2}$ and $F_{4M}$. At the same time, the scan selection signal $S_{4-2}$ is disabled during scan for the (4M−3)th and (4M−1)th fields $F_{4M-3}$ and $F_{4M-1}$. The scan selection signal $S_{4n}$ is similarly set. The scan selection signals $S_{4n-2}$ and $S_{4n}$ applied within one field interval have different voltage waveforms, and the in-phase voltage polarities are opposite to each other.

In the scan drive waveforms shown in FIG. 14A, a phase for disabling the entire screen (e.g., a voltage of 0V is simultaneously applied to all pixels constituting the screen) is the third phase. The third phase of the scan selection signal is set at a voltage of 0V (the same voltage level as that of the scan non-selection signal).

Referring to FIG. 14B, as an information signal applied to the signal electrode in the (4M−3)th field $F_{4M-3}$, a white signal (this signal is combined with the scan selection signal $S_{4n-3}$ to apply a voltage 3V0 exceeding the threshold voltage of the ferro-electric liquid crystal at the second phase to form a white pixel) and a hold signal (this signal is combined with the scan selection signal $S_{4n-3}$ to apply voltages ±V0 lower than the threshold voltage of the ferro-electric liquid crystal to a pixel) are selectively applied to the scan selection signal $S_{4n-3}$; and a black signal (this signal is combined with the scan selection signal $S_{4n-1}$ to apply a voltage −3V0 exceeding the threshold voltage of the ferro-electric liquid crystal at the second phase to form a black pixel) and a hold signal (this signal is combined with the scan selection signal $S_{4n-1}$ to apply voltages ±V0 lower than the threshold voltage of the ferro-electric liquid crystal to a pixel) are selectively applied to the scan selection signal $S_{4n-1}$. The scan non-selection signal is applied to the (4n−2)th and 4nth scan electrodes, so that the information signals are applied thereto without changes.

As the information signals applied to the signal electrodes in the (4M−2)th field $F_{4M-2}$ following the (4M−3)th field $F_{4M-3}$ described above, the black signal and the hold signal are selectively applied to the scan selection signal $S_{4-2}$ in the same manner as described above, and the white signal and the hold signal are selectively applied to the scan selection signal $S_{4n}$ as described above. The scan non-selection signal is applied to the (4n−3)th and (4n−1)th scan electrodes, so that the information signals are applied without changes.

As information signals applied to the signal electrodes in the (4M−1)th field $F_{4M-1}$ following the (4M−2)th field $F_{4M-2}$ described above, the black signal and the hold signal are selectively applied to the scan selection signal $S_{4n-3}$ as described above, and the white signal and the hold signal are selectively applied to the scan selection signal $S_{4n-1}$ as described above. The scan non-selection signal is applied to the (4n−2)th and 4nth scan electrodes, so that the information signals are applied without changes.

As information signals applied to the signal electrodes in the 4Mth field $F_{4M}$ following the (4M−1)th field $F_{4M-1}$ described above, the black signal and the hold signal are selectively applied to the scan selection signal $S_{4n-2}$ as described above, and the white signal and the hold signal are selectively applied to the scan selection signal $S_{4n}$ as described above. The scan non-selection signal is applied to the (4n−3)th and (4n−1)th scan electrodes, so that the information signals are applied without changes.

Figure 15A:
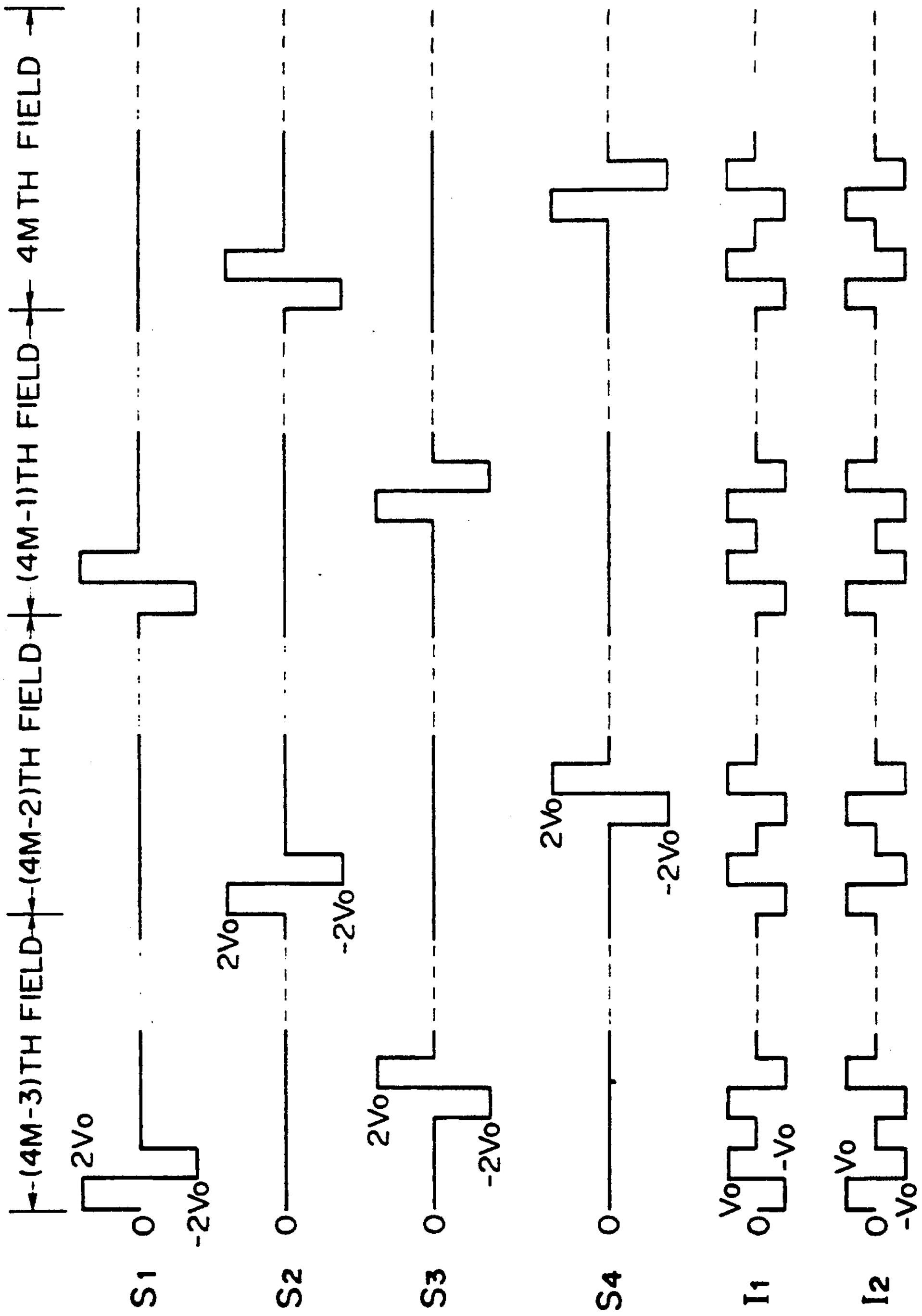
FIGS. 15A to 15C are timing charts thereof.
Figure 15B:
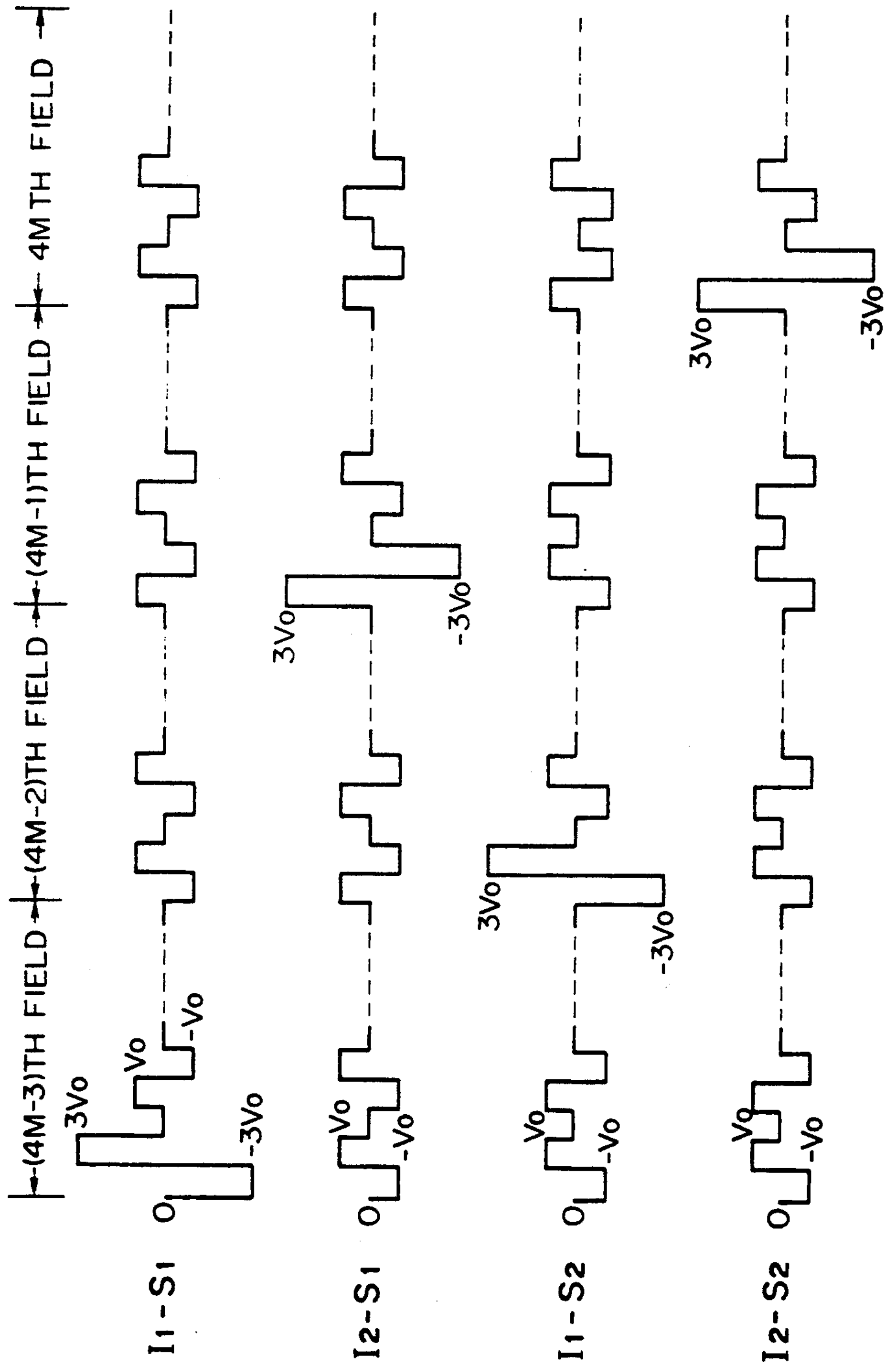
Figure 15C:
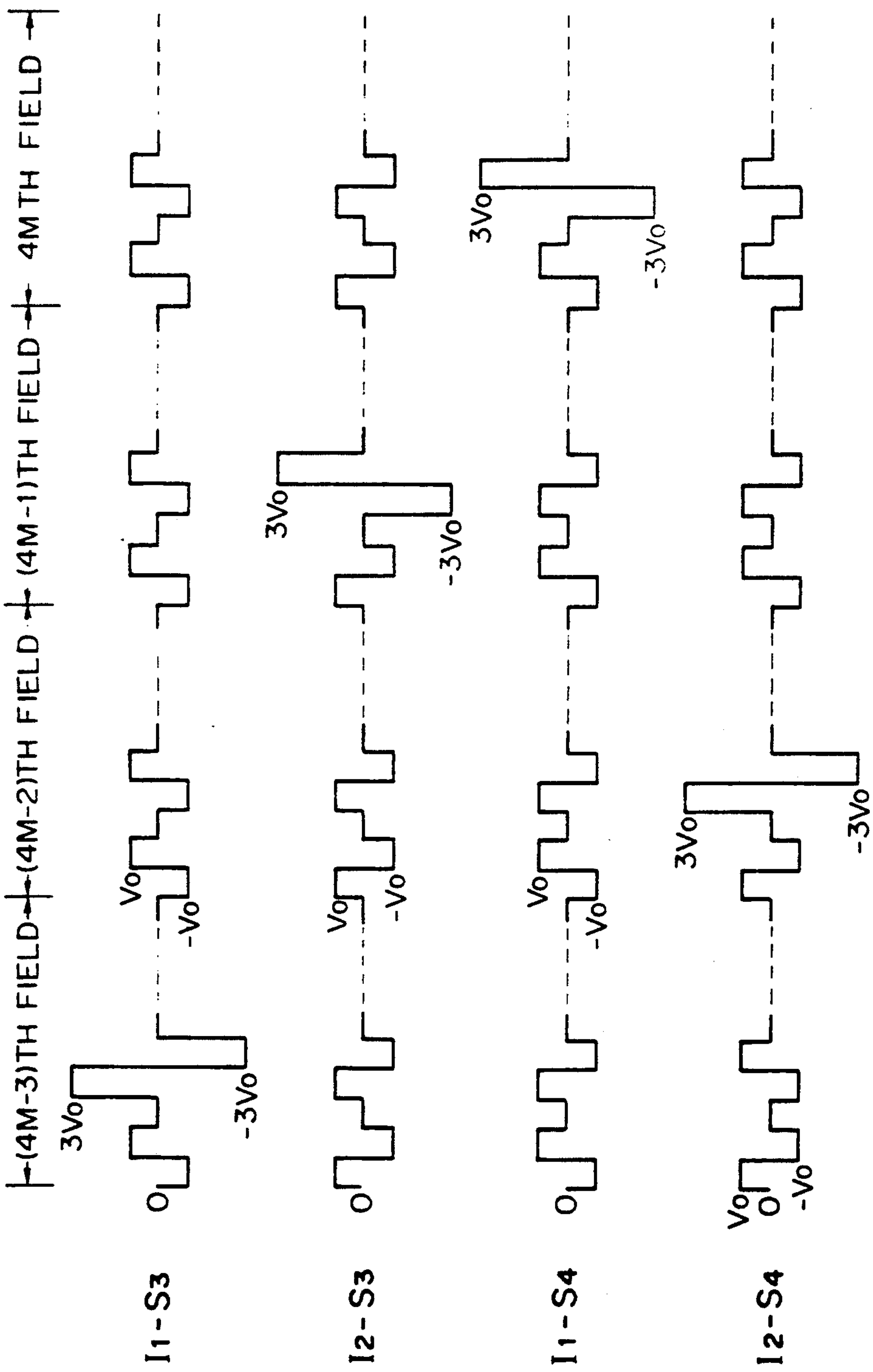
Figure 15D:
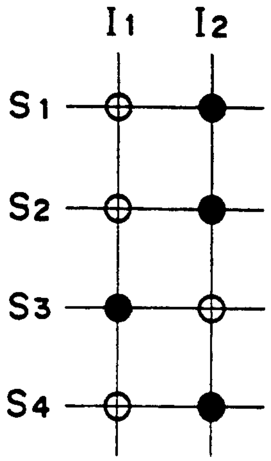
FIG. 15D is a view showing a display state of pixels at that time.

FIGS. 15A, 15B, and 15C are timing charts obtained when a display state of FIG. 15D is obtained by the drive waveforms shown in FIGS. 14A and 14B. A hollow dot in FIG. 15D represents a white pixel, and a solid dot represents a black pixel. I1−S1 in FIG. 15B is a time-serial waveform of a voltage applied to an intersection between the scan electrode S1 and the signal electrode I1. I2−S1 is a time-serial waveform of a voltage applied to an intersection between the scan electrode S1 and the signal electrode I2. Similarly, I1−S2 is a time-serial waveform of a voltage applied to an intersection between the scan electrode S2 and the signal electrode I1. I2−S2 is a time-serial waveform of a voltage applied to an intersection between the scan electrode S2 and the signal electrode I2.

The present invention is not limited to the drive waveforms described above. For example, the apparatus may multi-interlace scan every fifth, sixth, seventh, eighth, and preferably every ninth or more scan lines. The scan selection signal may have a waveform whose polarity is inverted every field, as shown in FIG. 14A, or may have the same waveforms in units of fields.

According to the present invention, the drive sequence shown in FIG. 13 can be used as multi-interlaced scan drive waveforms shown in FIGS. 14A to 15B.

Figure 16:
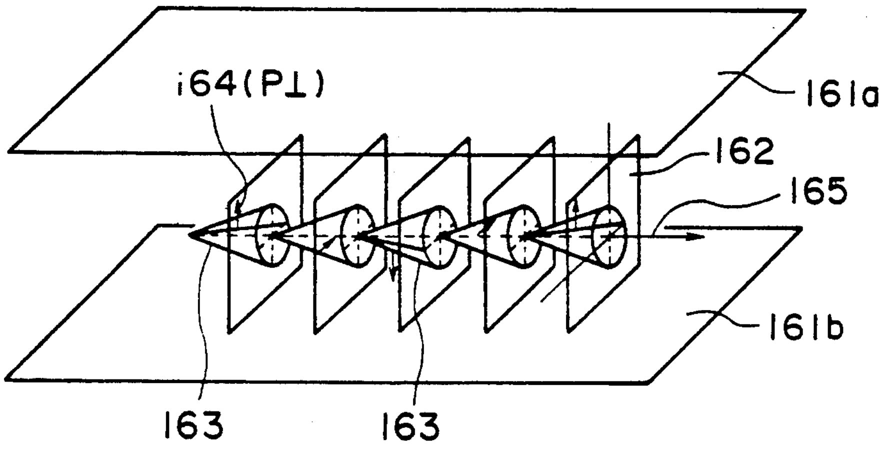
FIGS. 16 and 17 are respectively perspective views of ferro-electric liquid crystal cells used in the present invention.
Figure 17:
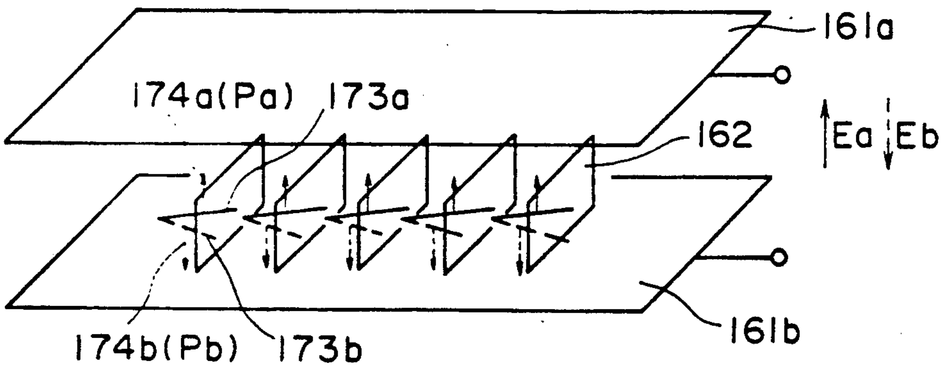

FIG. 16 illustrates an arrangement of a ferro-electric liquid crystal cell. Substrates (glass plates) 161*a* and 161*b* are coated with transparent electrodes such as $In_2O_3$, $SnO_2$ or ITO (indium-tin-oxide) films. A liquid crystal molecular layer 162 is formed between the substrates 161*a* and 161*b* such that a liquid crystal having an SmC* phase is aligned in a direction perpendicular to the glass surface. A thick line 163 represents a liquid crystal molecule. This liquid crystal molecule 163 has a bipolar moment (P⊥) in a direction perpendicular to the molecule. When a voltage exceeding a predetermined threshold value is applied across the substrates 161*a* and 161*b*, a helical structure of the liquid molecule 163 is untwisted, and all the bipolar moments (P⊥) 164 are directed toward the direction of electric field, thus changing the aligning direction of the liquid molecules 163. Each liquid crystal molecule has an elongated shape, and the refractive index anisotropy in the major axis is different from that in the minor axis. When polarizers are arranged on the upper and lower surfaces of the opposite glass plates in a positional relationship of crossed nicols, it is easily understood that the resultant structure serves as a liquid crystal modulation element whose optical characteristics are changed by the polarities of the applied voltages. In addition, when the thickness of the liquid crystal cell is sufficiently small (e.g., 1 μ), even if no electric field is applied, the helical structure of the liquid crystal molecule is untwisted, and the bipolar moment Pa or Pb is directed upward (174*a*) or downward (174*b*), as shown in FIG. 17. When an electric field Ea or Eb (the fields Ea and Eb have different polarities) having a predetermined threshold value is applied to the cell for a predetermined period of time, the bipolar moment is changed to direct upward 174*a* or downward 174*b* with respect to the electric field vector of the electric field Ea or Eb, as shown in FIG. 17. Therefore, the liquid crystal molecules are aligned in a first stable state 173*a* or a second stable state 173*b*.

There are two advantages derived from use of a ferro-electric liquid crystal as an optical modulation element. First, a response speed is very high. Second, the alignment of the liquid crystal molecules is bistable. The second point will be described with reference to FIG. 17. When the electric field Ea is applied, the liquid crystal molecules are aligned in the first stable state 173*a*. This state is stable even if the electric field is withdrawn. When the counter electric field Eb is applied to the cell, the liquid crystal molecules are aligned in the second stable state 173*b*. The molecular direction is changed but is kept unchanged even if the electric field is withdrawn. Unless the electric field Ea does not exceed a predetermined threshold value, the aligning state is kept unchanged. In order to effectively achieve high-speed operation and obtain a bistable state, the thickness of the cell is preferably minimized, and generally falls within the range of 0.5 μ to 20 μ and more preferably 1 μ to 5 μ.

As has been described above, in the information processing apparatus using the ferro-electric liquid crystal display device, when the two-line simultaneous drive waveform is used to increase the frame frequency, the graphic microprocessor monitors the transfer scan line address within the partial update routine. Therefore, continuous transfer of the image information of the same scan line address can be prevented.

In partial update for the display device having a memory function such as a ferro-electric liquid crystal display device, there is provided a circuit for managing partial update scan interval of the display panel of the graphic event. The partial update can be performed without inhibiting the VRAM access. That is, the partial update scan and storage of the image information in the VRAM can be simultaneously performed by the GCPU. A high-speed display application can be applied to a display device such as a ferro-electric liquid crystal display device having a low frame frequency. As a result, smooth, high-speed shift display can be achieved.

What is claimed is:

1. An information processing system comprising:

an image information memory for storing received image information;

first control means for controlling driving of a display panel; and second control means in response to an occurrence of a partial write scanning which scans a predetermined number of scan lines less than a total number of lines in a full screen only, for controlling said image information memory to store the image information for the partial write scanning therein, to set a timer with a time interval corresponding to the predetermined number, to inhibit memory access and interrupt a refresh scanning during the time interval set in the timer, to transfer the image information for the partial write scanning to said first control means and resume the refresh scanning after a commencement of the transfer of the image information.

2. A system according to claim 1, wherein said second control means comprises means for controlling said image information memory to inhibit said image information memory from storing image information which is being received when a display priority of a graphic event of the image information transferred to said first control means is higher than that of the image information which is being received.

3. A system according to claim 1, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said second control means and to store the image information which is being received in said image information memory when a display priority of a graphic event of the image information transferred to said first control means is lower than that of the image information which is being received.

4. An information processing system according to claim 1, wherein said display panel includes scan lines and information lines.

5. A system according to claim 4, wherein the stored image information consists of scan line address information for designating a scan line to be selected and display information for controlling a display information signal applied to an information line of the scan line to be selected, and further comprising means for serially transferring the image information.

6. A system according to claim 5, further comprising means for storing the scan line address information.

7. A system according to claim 4, wherein a highest priority display of the display priority order of the graphic events is a shift display.

8. An information processing apparatus comprising:

first means for controlling an image information memory so that received image information is stored in said image information memory;

second means for controlling said image information memory and a drive control circuit so that the image information stored in said image information memory is transferred to said drive control circuit; and third control means in response to an occurrence of a partial write scanning which scans a predetermined number of scan lines less than a total number of lines in a full screen only, for controlling said image information memory to store image information for the partial write scanning therein, to set a timer with a time interval corresponding to the predetermined number, to inhibit memory access and interrupt a refresh scanning during the time interval set in the timer, to transfer the image information for the partial write scanning to said first control means and resume the refresh scanning after a commencement of the transfer of the image information.

9. An information processing apparatus comprising:

first means for receiving image information having a plurality of graphic events;

second means for controlling an image information memory so that received image information is stored in said image information memory in a higher priority order of the graphic events on the basis of a preset priority order of the graphic events;

third means for controlling said image information memory so that the stored image information is transferred to drive control means in the higher priority order of the graphic events; and fourth control means in response to an occurrence of a partial write scanning which scans a predetermined number of scan lines less than a total number of lines in a full screen only, for controlling said image information memory to store the image information for the partial write scanning therein, to set a timer with a time interval corresponding to the predetermined number, to inhibit memory access and interrupt a refresh scanning during the time interval set in the timer, to transfer the image information for the partial write scanning to said first control means and resume the refresh scanning after a commencement of the transfer of the image information.

10. An apparatus according to claim 9, wherein the stored image information consists of scan line address information for designating a scan line to be selected and display information for controlling a display information signal applied to an information line of the scan line to be selected, and further comprising means for serially transferring the image information.

11. An apparatus according to claim 10, further comprising means for storing the output scan line address information.

12. An apparatus according to claim 9, wherein a highest priority display of the display priority order of the graphic events is a shift display.

13. An information processing apparatus comprising:

first means for controlling an image information memory so that received image information is stored in said image information memory;

second means for serially receiving scan line address information for designating a scan electrode selected from said image information memory and display information for controlling a display information signal applied to an information electrode on the scan electrode to be selected, and transferring the scan line address information and the display information to drive control means;

third means for storing the scan line address information; and fourth control means in response to an occurrence of a partial write scanning which scans a predetermined number of scan lines less than a total number of lines in a full screen only, for controlling said image information memory to store image information for the partial write scanning therein, to set a timer with a time interval corresponding to the predetermined number, to inhibit memory access and interrupt a refresh scanning during the time interval set in the timer, to transfer the image information for the partial write scanning to said first means and resume the refresh scanning after a commencement of the transfer of the image information.

14. An apparatus according to claim 13, further comprising means for controlling said drive control means for separating the scan line address information and the display information.

15. An apparatus according to claim 13, further comprising means for synchronizing with said drive control means.

16. An apparatus according to claim 13, wherein the scan line address information is information for designating each scan electrode for partial update scan.

17. An apparatus according to claim 13, wherein the scan line address information is information for designating each of the scan electrodes for performing one-frame scan.

18. An information processing system comprising:

an image information memory for storing received image information and outputting scan line address information for designating a scan line and image information corresponding to the designated scan line;

first control means for controlling driving of a display panel; and second control means for controlling the scan line address information output from the image information memory so as to interrupt a refresh-scan line scan display when a partial rewrite scan is instructed and prevent subsequent refresh-scan line scan for a new display from starting from a last scan line of previous refresh-scan line scan after the previous refresh-scan line scan is interrupted, in the partial rewrite scan a predetermined number of scan lines less than a total number of lines in a full screen being scanned.

19. A system according to claim 18, wherein said second control means comprises means for controlling said image information memory to inhibit said image information memory from storing image information which is being received when a display priority of a graphic event of the image information transferred to said first control means is higher than that of the image information which is being received.

20. A system according to claim 18, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said first control means and to store the image information which is being received in said image information memory when a display priority of a graphic event of the image information transferred to said first control means is lower than that of the image information which is being received.

21. An information processing system comprising:

an image information memory for storing received image information and outputting scan line address information for designating a scan line and image information corresponding to the designated scan line;

first control means for controlling driving of a display panel; and second control means for storing first scan line address information for designating a last scan line obtained when a scan line scan for display is interrupted when a partial rewrite scan is instructed, in the partial rewrite scan a predetermined number of scan lines less than a total number of lines in a full screen being scanned, comparing the first scan line address information with second scan line address information for designating a start scan line for new scan line scan, and decrementing or incrementing the second scan line address information when the first scan line address information is equal to the second scan line address information as a result of comparison.

22. A system according to claim 21, wherein said second control means comprises means for controlling said image information memory to inhibit said image information memory from storing image information which is being received when a display priority of a graphic event of the image information transferred to said first control means is higher than that of the image information which is being received.

23. A system according to claim 21, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said first control means and to store the image information which is being received in said image information memory when a display priority of a graphic event of the image information transferred to said first control means is lower than that of the image information which is being received.

24. An information processing system comprising:

an image information memory for storing received image information and outputting scan line address information for designating a scan line and image information corresponding to the designated scan line;

first control means for controlling driving of a display panel; and second control means for controlling the scan line address information output from said image information memory so as to prevent subsequent scan line scan for a new display from starting from a last scan line of previous partial update scan when a predetermined number of scan lines are scanned for the partial update scan, in the partial update scan a predetermined number of scan lines less than a total number of lines in a full screen being scanned.

25. A system according to claim 24, wherein said second control means comprises means for controlling said image information memory to inhibit said image information memory from storing image information which is being received when a display priority of a graphic event of the image information transferred to said first control means is higher than that of the image information which is being received.

26. A system according to claim 24, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said first control means and to store the image information which is being received in said image information memory when a display priority of a graphic event of the image information transferred to said first control means is lower than that of the image information which is being received.

27. An information processing system comprising:

an image information memory for storing received image information and outputting scan line address information for designating a scan line and image information corresponding to the designated scan line;

first control means for controlling driving of a display panel; and second control means for storing first scan line address information for designating a last scan line of scan line scan for a predetermined number of scan lines for partial update scan, comparing the first scan line address information with second scan line address information for designating a start scan line of subsequent scan line scan for a new display, and decrementing or incrementing the second scan line address information when the first scan line address information is equal to the second scan line address information as a result of comparison, in the partial update scan a predetermined number of scan lines less than a total number of lines in a full screen being scanned.

28. A system according to claim 27, wherein said second control means comprises means for controlling said image information memory to inhibit said image information memory from storing image information which is being received when a display priority of a graphic event of the image information transferred to said first control means is higher than that of the image information which is being received.

29. A system according to claim 27, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said first control means and to store the image information which is being received in said image information memory when a display priority of a graphic event of the image information transferred to said first control means is lower than that of the image information which is being received.

30. An information processing system comprising:

an image information memory for storing received image information and outputting scan line address information for designating a scan line and image information corresponding to the designated scan line;

first control means for controlling driving of a display panel so that a pixel on the scan line designated by the scan line address information is erased, the image information corresponding to the designated scan line is written, and a pixel on a scan line designated by another scan line address information next to the scan line address information is erased during writing of the image information; and second control means for controlling the scan line address information output from said image information memory so as to interrupt a refresh-scan line scan for display when a partial rewrite scan is instructed and prevent subsequent refresh-scan line scan for a new display from starting from a last scan line of previous refresh-scan line scan after the previous refresh-scan line scan is interrupted, in the partial rewrite scan a predetermined number of scan lines less than a total number of lines in a full screen being scanned.

31. A system according to claim 30, wherein said second control means comprises means for controlling said image information memory to inhibit said image information memory from storing image information which is being received when a display priority of a graphic event of the image information transferred to said first control means is higher than that of the image information which is being received.

32. A system according to claim 30, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said first control means and to store the image information which is being received in said image information memory when a display priority of a graphic event of the image information transferred to said first control means is lower than that of the image information which is being received.

33. An information processing system comprising:

an image information memory for storing received image information and outputting scan line address information for designating a scan line and image information corresponding to the designated scan line;

first control means for controlling driving of a display panel so that a pixel on the scan line designated by the scan line address information is erased, the image information corresponding to the designated scan line is written, and a pixel on a scan line designated by another scan line address information next to the scan line address information is erased during writing of the image information; and second control means for storing first scan line address information for designating a last scan line obtained when a scan line scan for display is interrupted when a partial rewrite scan is instructed, in the partial rewrite scan a predetermined number of scan lines less than a total number of lines in a full screen being scanned, comparing the first scan line address information with second scan line address information for designating a start scan line for new scan line scan, and decrementing or incrementing the second scan line address information when the first scan line address information is equal to the second scan line address information as a result of comparison.

34. A system according to claim 33, wherein said second control means comprises means for controlling said image information memory to inhibit said image information memory from storing image information which is being received when a display priority of a graphic event of the image information transferred to said first control means is higher than that of the image information which is being received.

35. A system according to claim 33, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said first control means and to store the image information which is being received in said image information memory when a display priority of a graphic event of the image information transferred to said first control means is lower than that of the image information which is being received.

36. An information processing system comprising:

an image information memory for storing received image information and outputting scan line address information for designating a scan line and image information corresponding to the designated scan line;

first control means for controlling driving of a display panel so that a pixel on the scan line designated by the scan line address information is erased, the image information corresponding to the designated scan line is written, and a pixel on a scan line designated by another scan line address information next to the scan line address information is erased during writing of the image information; and second control means for controlling the scan line address information output from said image information memory so as to prevent subsequent scan line scan for a new display from starting from a last scan line of previous partial update scan when a predetermined number of scan lines are scanned for the partial update scan, in the partial update scan a predetermined number of scan lines less than a total number of lines in a full screen being scanned.

37. A system according to claim 36, wherein said second control means comprises means for controlling said image information memory to inhibit said image information memory from storing image information which is being received when a display priority of a graphic event of the image information transferred to said first control means is higher than that of the image information which is being received.

38. A system according to claim 36, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said first control means and to store the image information which is being received in said image information memory when a display priority of a graphic event of the image information transferred to said first control means is lower than that of the image information which is being received.

39. An information processing system comprising:

an image information memory for storing received image information and outputting scan line address information for designating a scan line and image information corresponding to the designated scan line;

first control means for controlling driving of a display panel so that a pixel on the scan line designated by the scan line address information is erased, the image information corresponding to the designated scan line is written, and a pixel on a scan line designated by another scan line address information next to the scan line address information is erased during writing of the image information; and second control means for storing first the scan line address information for designating a last scan line of scan line scan for a predetermined number of scan lines for partial update scan, comparing the first scan line address information with second scan line address information for designating a start scan line of subsequent scan line scan for a new display, and decrementing or incrementing the second scan address information when the first scan line address information is equal to the second scan line address information as a result of comparison, in the partial update scan a predetermined number of scan lines less than a total number of lines in a full screen being scanned.

40. A system according to claim 39, wherein said second control means comprises means for controlling said image information memory to inhibit said image information memory from storing image information which is being received when a display priority of a graphic event of the image information transferred to said first control means is higher than that of the image information which is being received.

41. A system according to claim 39, wherein said second control means comprises means for controlling said image information memory to inhibit said image information memory from storing image information which is being received when a display priority of a graphic event of the image information transferred to said first control means is higher than that of the image information which is being received, and for controlling said image information memory to interrupt transfer of the image information to said first control means and to store the image information which is being received in said image information memory when a display priority of a graphic event of the image information transferred to said first control means is lower than that of the image information which is being received.

42. An information processing apparatus comprising:

first means for controlling an image information memory so that received image information is stored in said image information memory and scan line address information for designating a scan line and image information corresponding to the designated scan line are output from said image information memory;

second means for controlling said image information memory and a drive control circuit so that an output from said image information memory is transferred to said drive control circuit; and third means for storing first scan line address information for designating a last scan obtained when a scan line scan for display is interrupted when a partial rewrite scan is instructed, in the partial rewrite scan a predetermined number of scan lines less than a total number of lines in a full screen being scanned, comparing the first scan line address information with second scan line address information for designating a start scan line for new scan line scan, and decrementing or incrementing the second scan line address information when the first scan line address information is equal to the second scan line address information as a result of comparison.

43. An information processing apparatus comprising:

first means for controlling an image information memory so that received image information is stored in said image information memory and scan line address information for designating a scan line and image information corresponding to the designated scan line are output from said image information memory;

second means for controlling said image information memory and a drive control circuit so that an output from said image information memory is transferred to said drive control circuit; and third means for storing first scan line address information for designating a last scan line of scan line scan for a predetermined number of scan lines for partial update scan, comparing the first scan line address information with second scan line address information tion for designating a start scan line of subsequent scan line scan for a new display, and decrementing or incrementing the second scan line address information when the first scan line address information is equal to the second scan line address information as a result of comparison, in the partial update scan a predetermined number of scan lines less than a total number of lines in a full screen being scanned.

* * * * *

UNITED STATES PATENT AND TRADEMARK OFFICE

CERTIFICATE OF CORRECTION

PATENT NO. : 5,321,811

DATED : June 14, 1994

INVENTOR(S) : TAKASHI KATO, ET AL.

It is certified that error appears in the above-indentified patent and that said Letters Patent is hereby corrected as shown below:

ON TITLE PAGE

In [57] ABSTRACT:
Line 8, "information" should read --information,--.

IN THE DRAWINGS

Sheet 6 of 25, FIG. 5A:
"INTER-FACE" (both occurrences) should read --INTERFACE--.
Sheet 7 of 25, FIG. 5B:
"INTER-FACE" (both occurrences) should read --INTERFACE--.
Sheet 14 of 25, FIG. 9B:
"FIFLD" should read --FIELD--.

The title page, showing an illustrative figure, should be deleted and substitute therefor the attached title page.

COLUMN 1

Line 34, "employed((a" should read --employed (a--.

COLUMN 3

Line 19, "char" should read --chart--.

COLUMN 4

Line 46, "multi task" should read --multi-task--.

COLUMN 5

Line 36, "Ser." should read --Ser. No.--.

UNITED STATES PATENT AND TRADEMARK OFFICE

CERTIFICATE OF CORRECTION

PATENT NO. : 5,321,811

DATED : June 14, 1994

INVENTOR(S) : TAKASHI KATO, ET AL.

It is certified that error appears in the above-indentified patent and that said Letters Patent is hereby corrected as shown below:

COLUMN 6

Line 10, "ver" (both occurrences) should read --ver.--.

COLUMN 10

Line 23, "(>30 Hz)." should read --(≥30 Hz).--.

COLUMN 11

Line 47, "waveform 12" should read --waveform I2--.

COLUMN 16

Line 18, "output" should be deleted.

Signed and Sealed this

Seventh Day of February, 1995

Attest:

BRUCE LEHMAN

*Attesting Officer*

*Commissioner of Patents and Trademarks*

United States Patent [19]
Kato et al.

[11] Patent Number: 5,321,811
[45] Date of Patent: Jun. 14, 1994

[54] INFORMATION PROCESSING SYSTEM AND APPARATUS

[75] Inventors: Takashi Kato, Asaka; Hiroshi Inoue, Yokohama; Aiko Enomoto, Zama, all of Japan

[73] Assignee: Canon Kabushiki Kaisha, Tokyo, Japan

[21] Appl. No.: 987,242

[22] Filed: Dec. 7, 1992

Related U.S. Application Data

[63] Continuation of Ser. No. 451,523, Dec. 15, 1989, abandoned.

[30] Foreign Application Priority Data

Sep. 8, 1989 [JP] Japan .................................. 1-233771
Sep. 11, 1989 [JP] Japan .................................. 1-236310

[51] Int. Cl.[5] .................................................. G06F 3/00
[52] U.S. Cl. ........................................ 395/166; 395/164
[58] Field of Search ........................ 395/164, 166, 162; 340/718, 719, 750; 364/200 MS File, 900 MS File; 345/127, 129, 130, 132

[56] References Cited

U.S. PATENT DOCUMENTS 4,655,561 4/1987 Kanbe et al. .................... 350/350 S
4,691,200 9/1987 Stephany ............................ 340/784
4,709,995 12/1987 Kuribayashi et al. ............. 350/350
4,724,433 2/1988 Inoue et al. ......................... 350/805
4,776,676 10/1988 Inoue et al. ...................... 350/350 S
4,811,240 3/1989 Ballou et al. ........................ 364/518
4,816,819 3/1989 Enari et al. .......................... 340/811
4,830,467 5/1989 Inoue et al. ......................... 350/333
4,922,241 5/1990 Inoue et al. ......................... 340/784
4,930,875 6/1990 Inoue et al. ......................... 350/333
4,942,514 7/1990 Miyagaki et al. .................. 364/190
4,967,376 10/1990 Katsura ............................ 364/521

FOREIGN PATENT DOCUMENTS 0308987 3/1989 European Pat. Off. .
0318050 5/1989 European Pat. Off. .
0361471 4/1990 European Pat. Off. .
2569294 2/1986 France .

OTHER PUBLICATIONS

Journal of Physics E/Scientific Instruments, Experimental Driver And Addressing Techniques For Ferroelectric Liquid Crystal Devices, J. Wahl et al., vol. 21, No. 5, May 1988, Bristol, Great Britain, pp. 460–466.

*Primary Examiner*—Phu K. Nguyen
*Attorney, Agent, or Firm*—Fitzpatrick, Cella, Harper & Scinto

[57] ABSTRACT

In an information processing apparatus, transfer scan line addresses are monitored within a graphic microprocessor partial update routine to continuously transfer image information of addresses of the same scan line when a two-line simultaneous drive waveform is used to increase a frame frequency. The information processing system includes an image information memory for storing received image information a first control for controlling driving of a display memory, and a second control for controlling the image information memory so that storage of the image information in the image information memory and transfer of the image information stored in the memory to a drive control circuit are synchronized with each other.

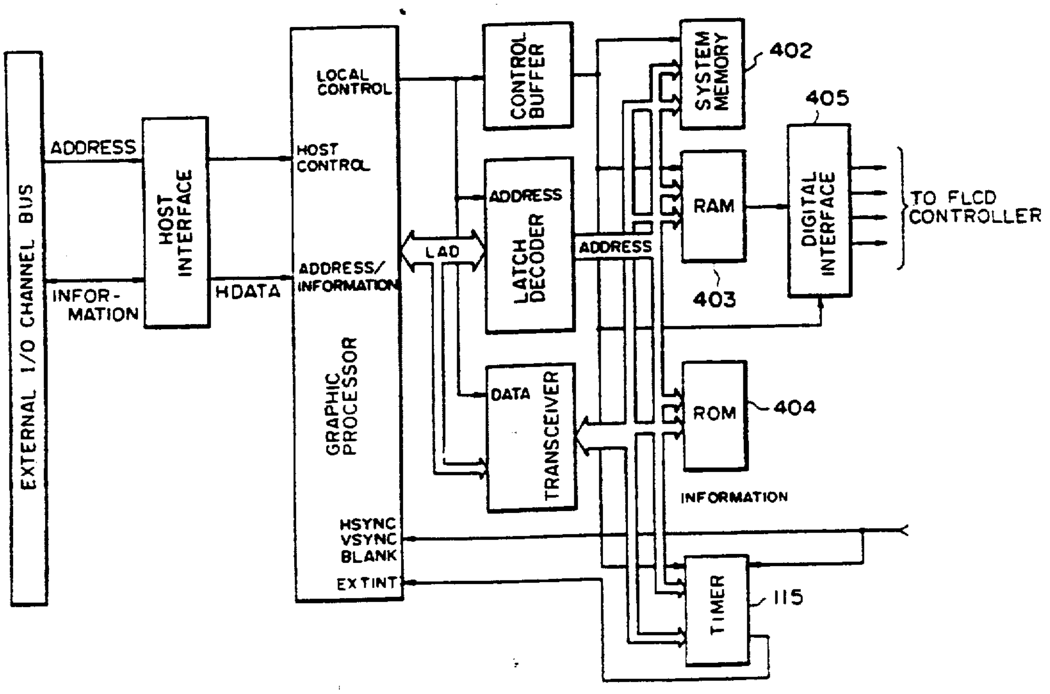

43 Claims, 25 Drawing Sheets